United States Patent [19]

Yasutomi et al.

[11] Patent Number: 5,130,055
[45] Date of Patent: Jul. 14, 1992

[54] CERAMIC COMPOSITE AND PROCESS FOR THE PRODUCTION THEREOF

[76] Inventors: Yoshiyuki Yasutomi, 6-1-403, Ishikawacho, Katsuta-shi; Kousuke Nakamura, 1-39, Ishinazakacho-1-chome, Hitachi-shi; Hideki Kita, 19-1-403, Ishinazakacho-1-chome, Hitachi-shi; Masahisa Sobue, 433-75, Yonezawacho, Mito-shi, all of Japan

[21] Appl. No.: 500,102

[22] Filed: Mar. 26, 1990

Related U.S. Application Data

[63] Continuation of Ser. No. 179,984, Apr. 11, 1988, abandoned.

Foreign Application Priority Data

| Apr. 10, 1987 [JP] | Japan | 62-86871 |
| May 8, 1987 [JP] | Japan | 62-110556 |
| Aug. 20, 1987 [JP] | Japan | 62-206698 |

[51] Int. Cl.$^5$ .................. C04B 35/56; C04B 35/58; H01B 1/06
[52] U.S. Cl. ............... 252/518; 252/516; 252/580; 501/87; 501/95
[58] Field of Search .......... 501/95, 97, 133, 154, 501/87; 428/212, 312.2, 312.6, 428, 698, 699, 700, 701; 252/516, 518, 520

[56] References Cited

U.S. PATENT DOCUMENTS

| 3,875,476 | 4/1975 | Crandall et al. | 252/516 |
| 4,341,965 | 7/1982 | Okuo et al. | 252/520 |
| 4,579,699 | 4/1986 | Verzemnieks |  |
| 4,719,151 | 1/1988 | Chyung et al. | 428/699 |

FOREIGN PATENT DOCUMENTS

| 0107349 | 9/1983 | European Pat. Off. |
| 0181208 | 11/1985 | European Pat. Off. |
| 0209320 | 7/1986 | European Pat. Off. |
| 2084703 | 12/1971 | France |

OTHER PUBLICATIONS

European Search Report, Application No. EP 88 10 5644, dated Jul. 18, 1988.

Primary Examiner—William R. Dixon, Jr.
Assistant Examiner—David M. Brunsman

[57] ABSTRACT

Disclosed is a ceramic composite which comprises particles of at least one inorganic compound selected from the group consisting of a carbide, a nitride, an oxide, a boride, a silicide and an oxy-nitride and particles and whiskers of $Si_3N_4$, $Si_2N_2O$ or $SiO_2$. This ceramic composite is small in volume change on sintering and superior in heat resistance and besides can absorb thermal shock by its voids. It can be used as ceramic heaters, current collectors, commutators for starter motor and alternator and the like.

12 Claims, 10 Drawing Sheets

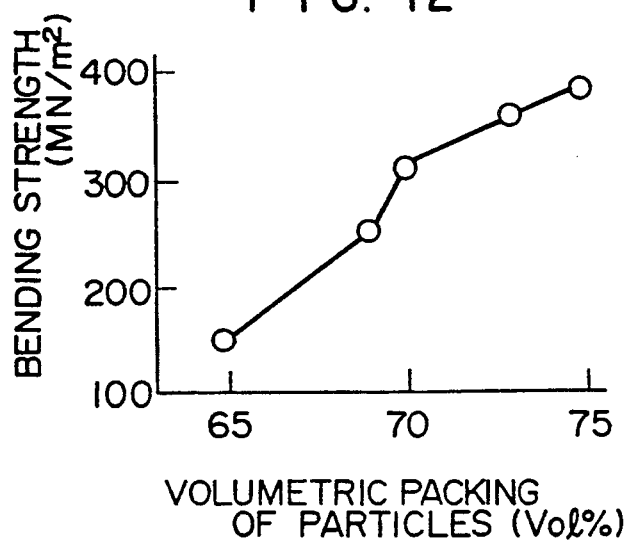
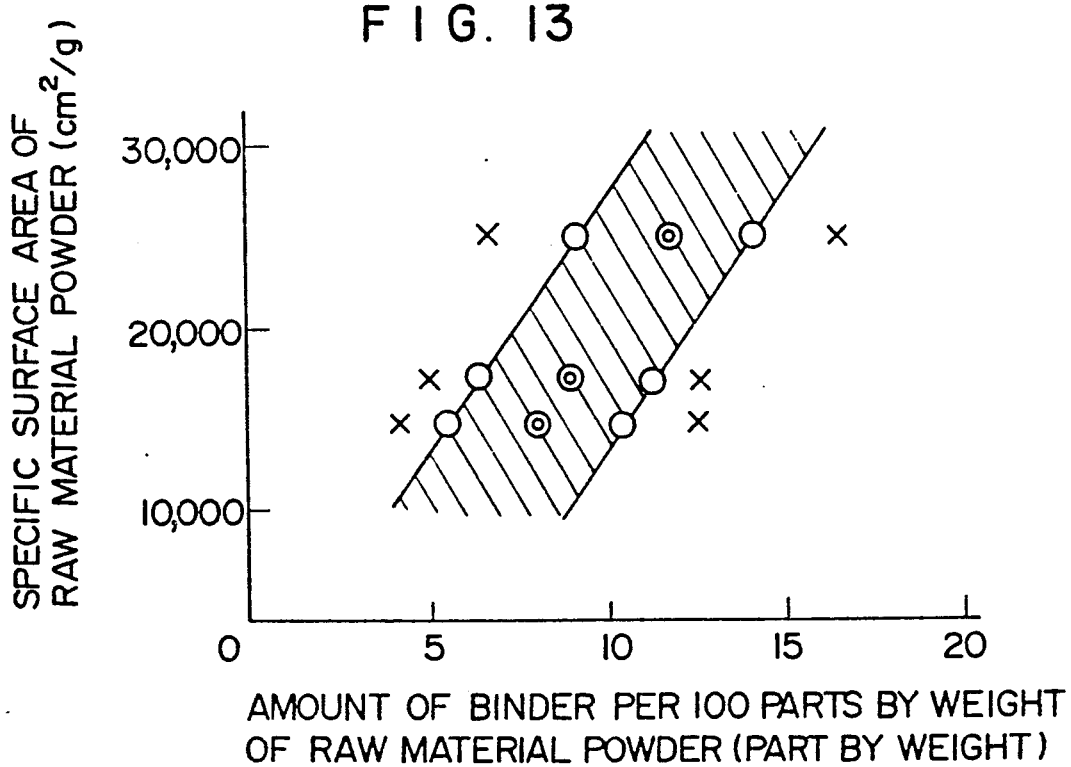

F I G. 14
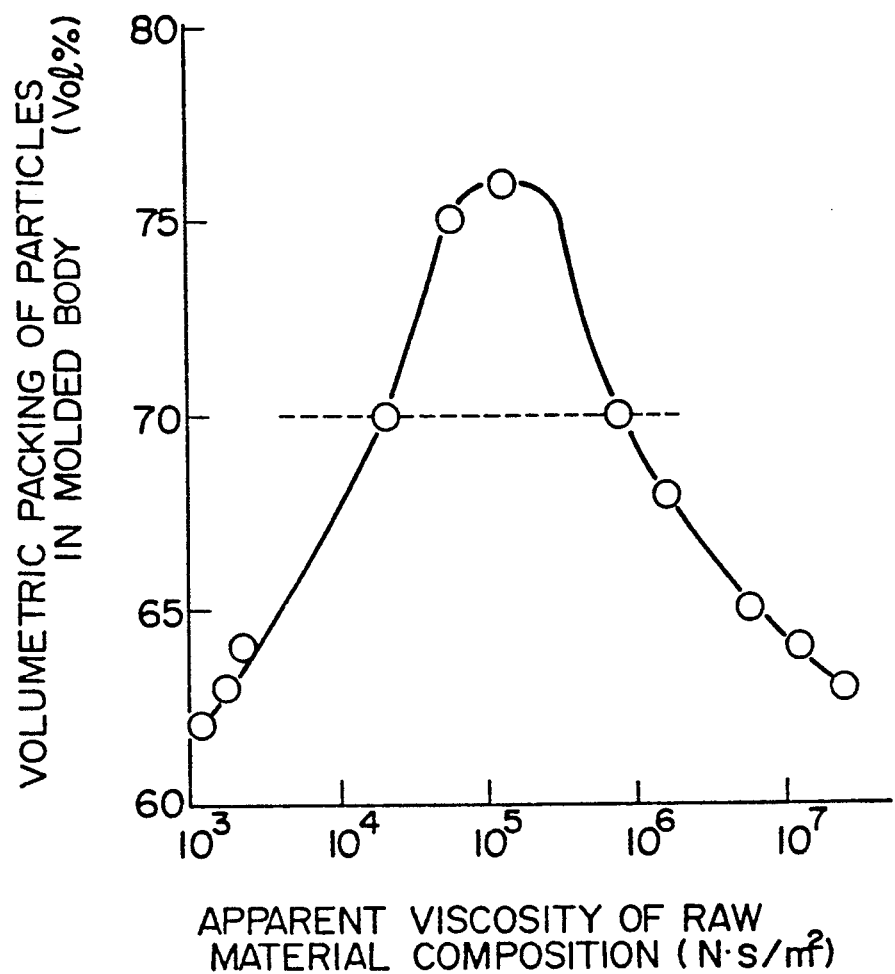

F I G. 17
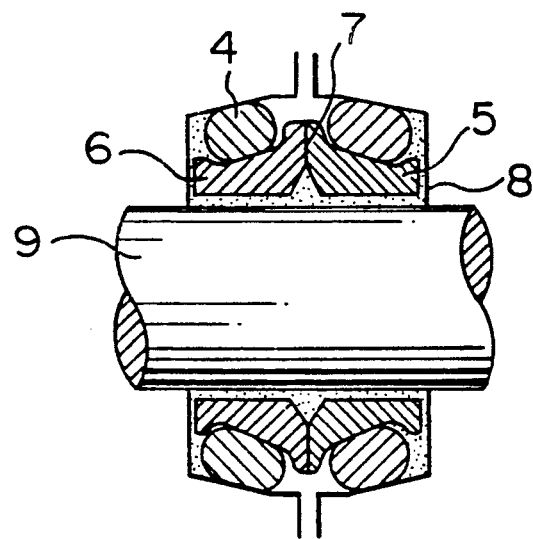
F I G. 18
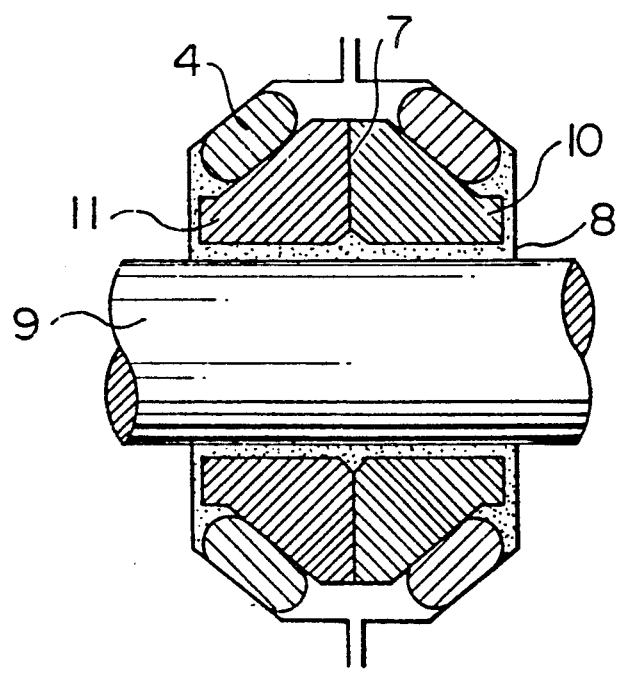

CERAMIC COMPOSITE AND PROCESS FOR THE PRODUCTION THEREOF

This is a continuation of copending application Ser. No. 07/179,984 filed on Apr. 11, 1988 now abandoned.

BACKGROUND OF THE INVENTION

1. Field of the Invention

This invention relates to a ceramic composite comprising particles of an inorganic compound and particles and whiskers of silicon nitride, silicon oxynitride and silicon oxide, and to a process for producing the ceramic composite. Further, this invention relates to an electric conductor, heater and sliding material comprising the ceramic composite.

2. Description of Related Art

Ceramics to be used as a conducting material, structural material or etc. has recently been required to have a high high-temperature strength, high toughness, high thermal shock resistance and high accuracy of dimension. As such ceramics are known inorganic compounds such as carbides, nitrides, oxides, borides, silicides and oxynitrides, for example, silicon nitride, silicon carbide, alumina and zirconia. These ceramic materials each is hardly used by itself to have so excellent properties as mentioned above. Therefore, many proposals have been made to achieve such properties by selecting the combinations of the ceramic materials and changing the design of structure.

As a heater there has hitherto been used a metal heater or ceramic heater. The metal heater includes nichrome or tantalumn. This heater has such a problem that it is poor in heat resistance and degraded at a temperature of 1,000° C. or higher.

As a ceramic heater practically used there are silicon carbide, stabilized zirconia, lanthanchromite, molybdenum silicide and the like. These ceramic materials have a relatively high electric resistance, and thermo-runaway easily occurs and temperature-controlling is very hard in such heater since such ceramic materials have a negative resistance-temperature coefficient. Furthermore, these ceramic materials have such defects that they are poor in mechanical strength and thermal shock resistance. Therefore, new electrically conductive ceramics as substitutions for the above-mentioned ceramic materials have been demanded and various trials have been made.

As described in, for example, Japanese Patent KOKAI (Laid-Open) No. 50-84936, SiC or $Si_3N_4$ is mixed with an electrically conductive compound and subjected to hot press sintering to eliminate the problem or defects as mentioned above. However, the hot press sintering method makes it possible to densify sintered bodies but the method has such a problem that cost for production is high since a great amount of energy is required for production.

As described in Japanese Patent KOKAI (Laid-Open) No. 60-44990, an electrically conductive ceramic enveloped with an electrically insulating ceramic is sintered by hot pressing, which requires a great amount of energy. Further, the hot pressing makes it impossible to mold and sinter products having a complicated shape. Generally, to integrate and sinter two or more ceramics having electric resistances different from each other, their coefficients of thermal expansion must be adjusted, but the hot pressing is carried out at so high temperatures that a small difference in coefficient of thermal expansion makes it easy for cracks to form.

Furthermore, Japanese Patent KOKAI (Laid-Open) No. 60-60983 discloses a process in which an electrically conductive material is mixed with $Si_3N_4$ particles and the mixture is sintered by pressureless sintering. In this process, a sintering aid is used and hence softening or deformation takes place inconveniently at high temperatures, and further a volume shrinkage of about 40 to 60% is brought about on sintering to induce deformation of sintered bodies. On the other hand, the sintering of the conductive material and $Si_3N_4$ particles in the absence of any sintering aid do not improve the density of the sintered bodies and, therefore, the specific resistance of the bodies is inconveniently high. Thus, the electrically conductive product according to this Patent KOKAI has unsatisfactory performance.

The Japanese Patent KOKAI references above do not take any account of shrinkage of molded bodies on sintering. Therefore, in these references shrinkage is brought about.

Generally, SiC, $Si_3N_4$ or the like is known as an engineering ceramic suitable for a structural material for engines or turbines. These ceramics are excellent in heat resistance and they are sintered by pressureless sintering, pressure sintering or reaction sintering. With the pressureless sintering and pressure sintering, a rate of dimensional change before and after sintering is 15 to 20%. Thus, these sintering techniques provide deformation and poor accuracy of dimension. On the other hand, it is known that the reaction sintering technique provides a lower rate of dimensional change than that of the other sintering techniques, but nevertheless, the rate is as high as about 1 to 1.5%, as shown in Japanese Patent KOKAI (Laid-Open) No. 58-140375.

As a material having a low rate of dimensional change, there is known a bonded $Si_3N_4$ product which has been used as a refractory material. Such material has a mechanical strength of only about 50 $MN/m^2$, as shown in Japanese Patent KOKAI (Laid-Open) No. 58-88169, and is not suitable as a structural material.

Furthermore, Japanese Patent KOKAI (Laid-Open) No. 61-201662 which has filed by the present applicant, discloses that a fully satisfactory rate of dimensional change on sintering is obtained but a body having a complicated shape is hardly obtained due to poor flowability of a starting mixture, and further the resultant sintered body has an insufficient mechanical strength.

Some of the reasons for hardly popularizing the engineering ceramics are that the rate of dimensional change on sintering is high and sintered bodies are hardly workable due to the high hardness and brittleness thereof. It is not too much to say that there have never been any practical process for producing a ceramic material having a high strength, low rate of dimensional change and high accuracy of dimension.

On the other hand, the ceramic material has been used as a sliding material for sealing having an excellent resistance to thermal shock.

Generally, working of a machine is always accompanied with sliding. Reduction of friction and wear will induce saving of energy and long life of a sliding material. For example, a floating seal comprising O-ring 4 and sealing elements 5 and 6 as shown in FIG. 17, has been used as a sealing means for cars or construction machines. In this means, one of these sealing elements is fixed, and the other is rotated in contact with the fixed element at the sliding surface 7 thereof and set through a lubricant 8 in a floating state with respect to an axis 9, thereby keeping the sealing property of the means. Therefore, this means is most suitable for sealing or protecting from earth and sand and has widely been used. However, this floating seal has such a defect that it is poor in heat resistance and wear resistance since it is made of a cast iron material. Another sealing means is known in which one of sealing elements 10 is made of Cr cast iron and the other 11 is made by injection molding. This sealing means has also the same defect as mentioned above.

On the other hand, a ceramic-made sliding means has recently been provided. A typical example of the ceramics for the sliding means includes SiC, $Si_3N_4$, $Al_2O_3$ or $ZrO_2$, but it is practically required to have the following properties as the sliding material (see "Kogyo Zairyo", Vol. 31, No. 12, pp. 139–146, particularly 140):

(1) a high hardness and an excellent resistance to wearness and seizing;

(2) a good affinity to a sliding partner (a low coefficient of friction and a small amount of the partner worn);

(3) a good corrosion resistance;

(4) a high strength, toughness and resistance to thermal shock;

(5) a small amount of deformation by stress and/or heat at sliding surfaces to keep a good lubrication state on the sliding surfaces (i.e., a high Young's modulus and a small coefficient of thermal expansion);

(6) a high thermal conductivity (The increase of the coefficient of friction and thermal deformation on the sliding surfaces are prevented by increasing the resistance to thermal shock and inhibiting the accumulation of frictional heat.); and (7) a low specific gravity (centrifugal stress is reduced).

These required properties all are not satisfied by known materials. For example, a metallic material is questionable in the resistance to seizing. $Al_2O_3$ itself has a low resistance to thermal shock, and since it has a high coefficient of thermal expansion, it is easily deformed by heat on the sliding surfaces thereof. $ZrO_2$ itself also has a low resistance to thermal shock and a high coefficient of thermal expansion. $Si_3N_4$ itself has a low thermal conductivity. SiC alone has a high hardness and high thermal conductivity but has a poor resistance to thermal shock. A sliding material having both excellent wear resistance and corrosion resistance and conspicuously improved resistance to thermal shock has been demanded.

Among these sliding materials SiC is widely used in a sintered form. For example, Japanese Patent KOKAI (Laid-Open) No. 61-163174 discloses "a sliding material comprising an SiC sintered porous body having an excellent sliding property under wet conditions" and Japanese Patent KOKAI (Laid-Open) No. 55-100421 discloses "a sliding means comprising a fixed part and rotating part, any one of the parts being made of $Si_3N_4$ and the other made of SiC".

However, these Japanese Patent KOKAI references all do not draw any attention to resistance to thermal shock and one-side contact.

Thus, the prior art materials have no combination of good wear resistance and thermal shock resistance and further have such drawbacks that cracks are generated due to a rapid change of temperatures and they allow their partners to be worn.

SUMMARY OF THE INVENTION

The objects of the present invention are to eliminate the defects or drawbacks as described above.

The present invention has the following three aspects:

FIRST ASPECT

One object of the present invention is to provide a ceramic composite containing two or more layers having different electric resistances formed by near net shaping.

Another object of the present invention is to provide the ceramic composite further having a very small rate of dimensional change on sintering molded bodies.

A still further object of the present invention is to provide a current collector ring for revolving electric machines, made from the ceramic composite.

SECOND ASPECT

An object of the present invention is to provide an engineering ceramic composition suitable for near net shaping with a high accuracy of dimension and giving a ceramic sintered body which does not require any machining and has a small rate of dimensional change on sintering, high high-temperature strength and good resistance to thermal shock, the composition further having a good flowability in molding.

THIRD ASPECT

An object of the present invention is to a sliding and sealing means having a good wear resistance, corrosion resistance and thermal shock resistance and a reduced worn amount of a sliding partner.

BRIEF DESCRIPTION OF THE DRAWINGS

FIGS. 11 and 12 are graphs which show the relation between volumetric particle packing rate of molded bodies and bending strength in the SECOND ASPECT of the present invention.

FIG. 13 is a graph which shows the relation between specific surface area of raw material powder and amount of molding binder in the SECOND ASPECT of the present invention.

FIG. 14 is a graph which shows the relation between apparent viscosity of raw material composition measured by flow tester and volumetric particle packing rate in the SECOND ASPECT of the present invention.

FIG. 17 is a cross-sectional view of an example of a conventional floating seal.

FIG. 18 is also a cross-sectional view of another example of a floating seal.

DETAILED DESCRIPTION OF PREFERRED EMBODIMENTS

FIRST ASPECT

Figure 1A:
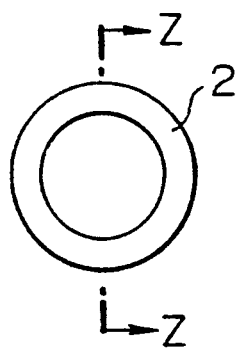
FIGS. 1(A) and 1(B) are schematical cross-sectional views of one embodiment according to the FIRST ASPECT of the present invention.

The ceramic composite of the present invention is one prepared by integral molding and integral sintering ceramics different in electric resistivity to bond them with particles or whiskers of at least one of $Si_3N_4$, $Si_2N_2O$ and $SiO_2$ produced from metallic Si or ferro-Si.

In the ceramic composite of the present invention, ceramics contiguous to each other and different in electrical resistivity and electrically conductive compounds for changing the resistivity are non-oxide type conductive materials which are nitrides, carbides, borides and silicides of substances of Groups IIIa, IVa, Va, VIa and VIII of the periodic table and preferred are TiN, TiC, $TiB_2$, $TiSi_2$, ZrN, ZrC, $ZrB_2$, $ZrSi_2$, HfN, HfC, TaN, TaC, $TaB_2$, $TaSi_2$, $Mo_2N$, $Mo_2C$, MoB, $Cr_2N$, $Cr_3C_2$, CrB, $CrSi_2$, NbN, NbC, $NbSi_2$, VN, VC, WC and $WSi_2$. Especially, TiN, TiC, ZrN, ZrC, $Cr_2N$ and $Cr_3C_2$ are excellent in oxidation resistance and are suitable.

Content of electrically conductive particles in sintered body which are for decreasing electrical resistivity in the present invention is preferably 80 vol % or less. If the content is more than 80 vol %, characteristics of ceramics such as mechanical strength, thermal shock resistance and oxidation resistance decrease.

In the present invention, electrical resistivity of sintered bodies can be optionally changed by changing content of conductive particles in the sintered bodies in the range of 5-80 vol %. Furthermore, the resistivity in the range of $10^{14}$ Ω cm–$10^{-5}$ Ω cm can be optionally obtained by containing electrically insulating particles in sintered body.

In the ceramic composite of the present invention, conductive particles or insulating particles are bonded with at least one of $Si_3N_4$, $Si_2N_2O$ and $SiO_2$ produced from metallic Si or ferro-Si and volume change on sintering is small and there occur no deformation. Further, two layers different in electrical resistivity are bonded with $Si_3N_4$, $Si_2N_2O$ or $SiO_2$ produced from metallic Si or ferro-Si and the bonded interface is also superior in heat resistance and thermal shock resistance like the body.

The sintered bodies of the present invention preferably have a void content of 5-40%. When void content exceeds 40%, mechanical strength decreases and besides it is difficult to lower the resistivity. When it is less than 5%, permeation resistance of nitriding gas or oxidizing gas with which metallic Si or ferro-Si reacts is increased to make it difficult to obtain good sintered bodies. This is because in order that conductive compound or insulating compound, metallic Si or ferro-Si react with nitriding gas or oxidizing gas to form $Si_3N_4$, $SiO_2$ or $Si_2N_2O$ phase to bond the insulating compound or conductive compound, there are needed voids for permeation of said gas through molded body.

Presence of 5-40% of voids in sintered body causes relaxation of strain produced due to difference in thermal expansion coefficient of the layers different in electrical resistivity and thus formation of cracks can be prevented.

It is preferred that metallic Si or ferro-Si has an average particle size of 5 μm or less. When this is greater than 5 μm, nitriding requires much time and besides remaining Si is present.

In the present invention, as molding binders, there may be used, for example, thermoplastic resins such as polyvinyl butyral and polyethylene and organosilicone high molecular compounds such as silicone imide compounds and polysilane compounds. These binders are preferably added in an amount of 2-20 parts by weight to adjust the relative density of molded body to 60% or higher.

In the present invention, molded body is heated to 1350° C. or higher in a nitriding gas, oxidizing gas or oxidizing and nitriding gas atmosphere such as nitrogen, ammonia and oxygen (if necessary, gases such as hydrogen, argon, helium and carbon monoxide may be contained).

As the metallic Si, ferro-Si, insulating compounds and conductive compounds, commercially available ones may be used as such. More preferably, they are pulverized by a mill to round particles.

In case whiskers are previously mixed with and dispersed in raw materials, all whiskers are not bonded to particles and massive whiskers or singly existing whiskers remain between particles of sintered body. On the other hand, in the present invention, particles and whiskers are bonded by a lot of needle-like whiskers produced from particles in molded body crossing nearly straightly in the spaces between particles and this greatly takes part in the high thermal shock resistance and strength.

According to the present invention, spaces between particles and/or whiskers of the insulating compound and conductive compound are bonded three-dimensionally with many whiskers produced from Si particles in the molded body and there are substantially no whiskers not in bonded state and thus sintered bodies of high toughness and high-temperature strength can be obtained.

Average particle size of the insulating compound and the conductive compound is preferably 100 μm or less. When it is more than 100 μm, strength of sintered body is reduced. When previously produced whiskers of the insulating compound or the conductive compound are used, they preferably have an average aspect ratio of 2-50 and length of 0.2-100 μm. When the aspect ratio is less than 2 and length is less than 0.2 μm, they have no effects as whiskers and when the aspect ratio is more than 50 and the length is more than 100 μm, mixing of raw materials becomes difficult and dispersibility is inferior.

In the present invention, the ceramic composite contains whiskers in an amount of 1–70 vol % (preferably 10–30 vol %) per particles and whiskers produced in sintered body because outside this range, effects of the present invention cannot be obtained.

Molding method is selected from injection molding, casting, rubber press molding, extrusion molding, metal mold molding and the like depending on shape and required characteristics.

After removal of molding aid and the like, the molded body is subjected to heat treatment for formation of whiskers.

Particles or whiskers produced from metallic Si or ferro-Si are most preferably of $Si_3N_4$.

Among the conductive compounds used in the present invention, silicides and borides react with nitrogen in nitriding gas, resulting in cracks in sintered body if sintering time is not proper. Therefore, nitrides and carbides are most preferred.

Whiskers of $Si_3N_4$, SiC or the like may be blended as raw materials in addition to the whiskers produced from Si particles. However, use of the former whiskers in a large amount causes ununiformity and is not preferred. Further, whiskers may be used as insulating compound and conductive compound.

In order to obtain a void content of less than 5%, it is possible to re-sinter the sintered body. The re-sintering can be effected by hot pressing, hot isotactic pressing or under normal pressure using a sintering aid. Thus, whiskers are present three-dimensionally in the sintered body and so a ceramic composite of high heat resistance can be obtained. However, unless the difference in thermal expansion coefficient is made as small as possible, cracks can occur.

Further, since the sintered body of the present invention has voids, lubricants can be contained in the voids.

In the ceramic composite of the present invention, since the electrically conductive compound and the insulating compound are firmly bonded with particles or whiskers of $Si_3N_4$, $Si_2N_2O$ or $SiO_2$ produced from metallic Si or ferro-Si, volume change on sintering is small and the composite is excellent in heat resistance. Further, it has voids and can absorb thermal shock.

According to the present invention, there can be easily obtained ceramic composite small in volume change on sintering and having optional resistivity within the range of $10^{14}$–$10^{-5}$ Ωcm by adjusting amount of conductive compound and insulating compound.

Thus, the composite can be used for various heaters, current collector of generators, brushes for motors, commutators for starter motors, commutators for alternators, etc.

According to the present invention, the sintered body obtained by molding and sintering by near net shaping has markedly small dimensional changes and ceramic composites comprising conductive portion and insulating portion of optional resistivities can be easily obtained.

By using these ceramic composites, ceramic heaters, current collector rings for revolving electrical machinery, brushes for motors and commutators for starters and alternators can be provided.

SECOND ASPECT

The present invention relates to a method for making ceramics of high strength and high dimensional accuracy which comprises adding a thermoplastic resin as a binder to metallic Si powders or inorganic compound powders containing at least 45 vol % of metallic Si powders, heating and kneading the mixture, subjecting the kneader product to warm pressure molding to form a molded body of at least 70 vol % in volumetric packing of powders (ratio of volume occupied by powders in the molded body), removing the binder in the molded body by heating and then heating and sintering the molded body in a nitriding gas atmosphere to bond particles of $Si_3N_4$ and the inorganic compound with $Si_3N_4$ particles and whiskers produced from said Si.

Furthermore, the present invention relates to a composition for ceramics of high dimensional accuracy which contains metallic Si powders or inorganic compound powders containing at least 45 vol % of metallic Si powders and a binder of thermoplastic resin and has an apparent viscosity at 150° C. of $(3–90) \times 10^4$ N·s/m².

When amount of Si powders is less than 45 vol %, dimensional change on sintering cannot be made small and besides, ceramic sintered body of enough strength cannot be obtained. In the present invention, the dimensional change on sintering can be made less than 0.2% by adjusting the content of Si powders to at least 45 vol %. Of course, Si content may be 100%.

When volumetric packing of particles in the molded body is less than 70 vol %, ceramic sintered body of sufficient strength cannot be obtained. By increasing it to at least 70 vol %, sintered body having a bending strength of about 300 MN/m² or more can be obtained. This is the most effective means especially for improvement of strength.

Said inorganic compound is at least one compound selected from oxides, carbides, nitrides, oxy-nitrides, silicides and borides and the inorganic compound desirably has a melting point or sublimation temperature of 1400° C. or higher.

As the inorganic compound, mention may be made of, for example, TiN, $Si_3N_4$, $Si_2N_2O$, TiC, $TiO_2$, AlN, $Al_2O_3$, $SiO_2$, ZrN, $ZrO_2$, ZrC, $TiB_2$, $ZrB_2$, $Cr_3C_2$, $Cr_7C_2$, CrB, $Cr_2N$, WC, $W_2C$, $WSi_2$, $TiSi_2$, $ZrSi_2$, $Fe_3C$, VC, VN, $CeC_2$, MgO, $Mo_2N$, $Mo_2C$, MoB, ThC, HfN, HfC, TaN, TaC, $TaB_2$, NbN, BeO, WN, CaO, $TaSi_2$ and $CrSi_2$.

Among these inorganic compounds, silicides and borides react with nitrogen during sintering in a nitriding gas and hence cracks might occur in the sintered body if sintering conditions are not proper. Therefore, carbides, nitrides and oxy-nitrides are preferred.

As the metallic Si powders, ferro-Si containing Fe may be used. However, there is the possibility of Fe remaining in the sintered body to cause reduction of high-temperature strength.

Desirably, particle size of said Si powders is 10 μm or less, preferably 1 μm or less and that of the inorganic compound is 100 μm or less, preferably 20 μm or less. As these powders, there may be used commercially available ones as they are, but preferably they are pulverized by a mill to round particles.

A part of said inorganic compound powders may be replaced with whiskers. In this case, amount of whiskers is desirably 55 vol % or less in the sintered body. When the amount is more than 55 vol %, sometimes uniform blend of raw materials cannot be obtained. The whiskers added preferably have an average aspect ratio of 200 or less and an average length of 200 μm or less.

As the binder resins, there may be used thermoplastic resins used for preparation of pre-molded body for obtaining sintered ceramics. Examples thereof are polyvinyl butyral, polyethylene, polysilicone, synthetic waxes.

In the present invention, the binder has an important role and addition amount thereof has a great function for attaining a packing of particles of at least 70 vol % in molded body.

The inventors have made various studies on this point and have found that there is a very close correlation between specific surface area of raw material powders and addition amount of the binder per 100 parts by weight of said raw material powders. The present invention is based on this finding.

Firstly, the specific surface area S (cm²/g) of raw material powders can be obtained by the following formula.

$$S = \frac{6}{\rho \cdot d}$$

wherein $\rho$ is a density and d is an average particle size (μm).

Relation between said specific surface area and amount B of the binder (part by weight per 100 parts by weight of raw material powder composition) necessary for obtaining a particle packing of molded body of at least 70 vol % is shown by the following formula.

$$B = [(7S/20,000) + 3] \pm 2.5$$

By adding the binder in an amount within the range given by the above formula, particle packing of the molded body can be made at least 70 vol % and a sintered body having a bending strength of about 300 MN/m² or more can be provided.

Raw material composition containing the binder in an amount of the above range has an apparent viscosity of $(3-90) \times 10^4$ N·s/m² as explained hereinafter and by selection of this viscosity range, fluidity at molding can be estimated and besides a molded body of at least 70 vol % in packing can be obtained. Thus, composition suitable for near net shaping can be provided.

From the point of fluidity of raw material composition, it is preferred to use Si powders of 1 μm or less in particle size and to use as a binder a blend comprising 15-60% by weight of polyethylene, 30-70% by weight of wax and 5-25% by weight of stearic acid.

The raw material composition to which the binder is added is well kneaded and then molded. Molding method is selected from injection molding, press molding, rubber press molding, extrusion molding, powder molding and the like depending on shape and required characteristics and warm molding is carried out at higher than softening point of binder resin. For example, when mechanical press is used, molding pressure may be about 1000 kgf/cm².

The resulting molded body is degreased (removal of binder) before sintering. Degreasing is carried out by gradually heating the molded body from room temperature to about 500° C. at about 2° C./h.

This molded body is preferably heated to lower than the melting point of metallic Si (lower than 1410° C.), especially 1100°-1350° C. in a nitriding gas atmosphere comprising nitrogen and/or ammonia, and if necessary, further comprising hydrogen, argon, helium or the like.

Heating rate until sintering temperature is suitably 4° C./h and the molded body can be easily sintered by such heating. If necessary, hot pressing may be applied.

Preferably, the sintered body has a void content of 30% or less. When the void content exceeds 30%, strength decreases. The void content of 30% or less can be obtained by adjusting the volumetric packing of particles in the molded body to at least 70 vol %.

$Si_3N_4$ whiskers are produced in the sintered body during sintering and such whiskers are preferably contained in an amount of 1-70 vol %, especially 10-30 vol % for the reaction-produced phase.

The reasons why according to the present invention, there is obtained ceramics small in dimensional change (less than about 0.15%) on sintering and having a bending strength of 300 MN/m² or higher are considered as follows.

First, $Si_3N_4$ whiskers produced by sintering in nitriding atmosphere greatly take part in dimensional change on sintering. This is clear from accompanying FIGS. 8 and 9.

Figure 8:
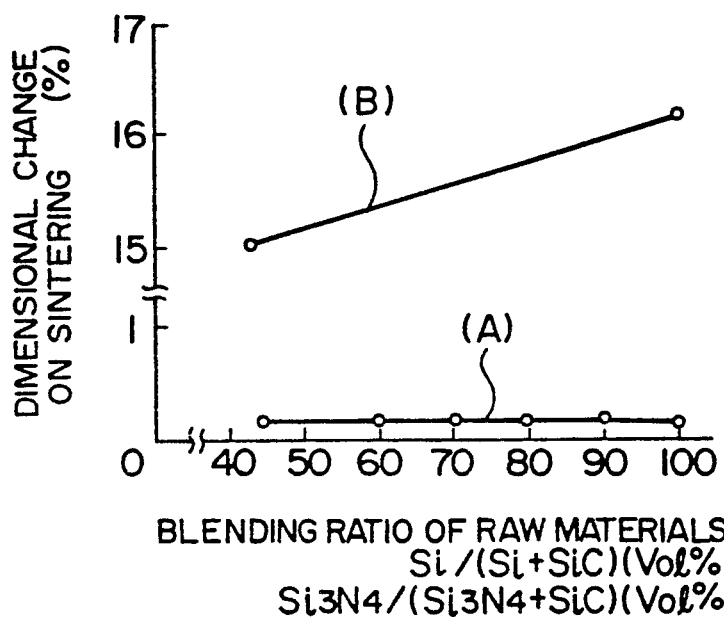
FIG. 8 is a graph which shows the relation between rate of dimensional change on sintering and mixing ratios of raw materials in the SECOND ASPECT of the present invention.
Figure 9:
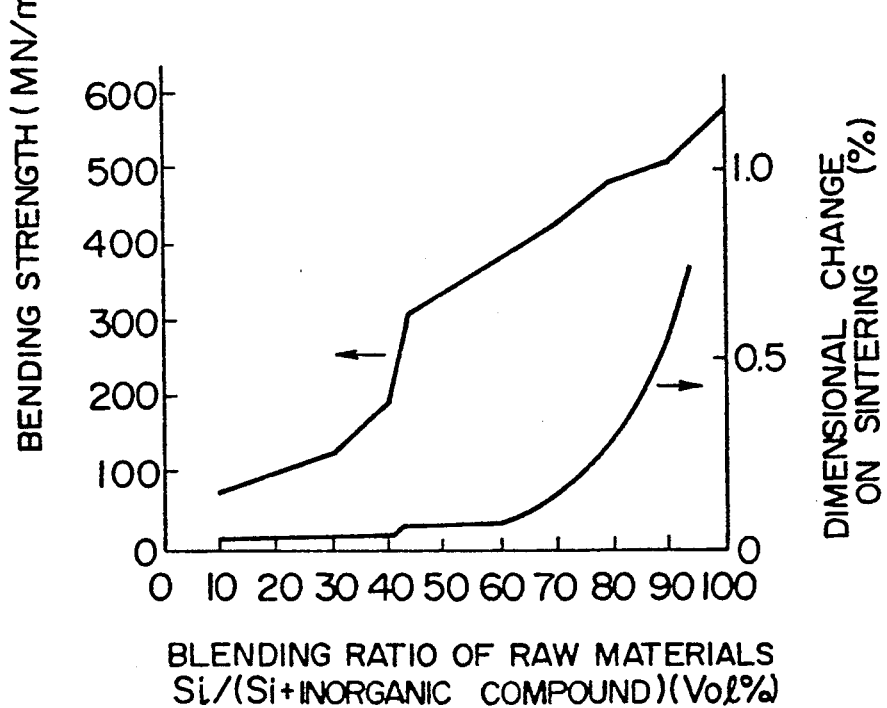
FIG. 9 is a graph which shows the relation among mixing ratios of raw materials [Si/(Si+inorganic compound)], rate of dimensional change on sintering and bending strength in the SECOND ASPECT of the present invention.

FIGS. 8 and 9 show relation between blending ratio of raw materials [Si/(Si+inorganic compound)] and dimensional change on sintering or bending strength when sintered bodies were produced by adding 9 parts by weight of a thermoplastic resin to a mixture of Si and inorganic compound, heating and kneading the mixture, subjecting it to warm pressure molding, then removing the binder and sintering the molded body in nitrogen gas. With increase in the amount of Si, amount of whiskers of produced $Si_3N_4$ increases and strength increases. Dimensional change on sintering increases, but this increase can be practically ignored.

It is considered that this is because the whiskers produced by sintering closely connect the particles of sintered body. That a sintered body having a bending strength of 300 MN/m² is obtained especially when Si is more than 45 vol % is considered due to the increase of such connecting chains.

Figure 10:
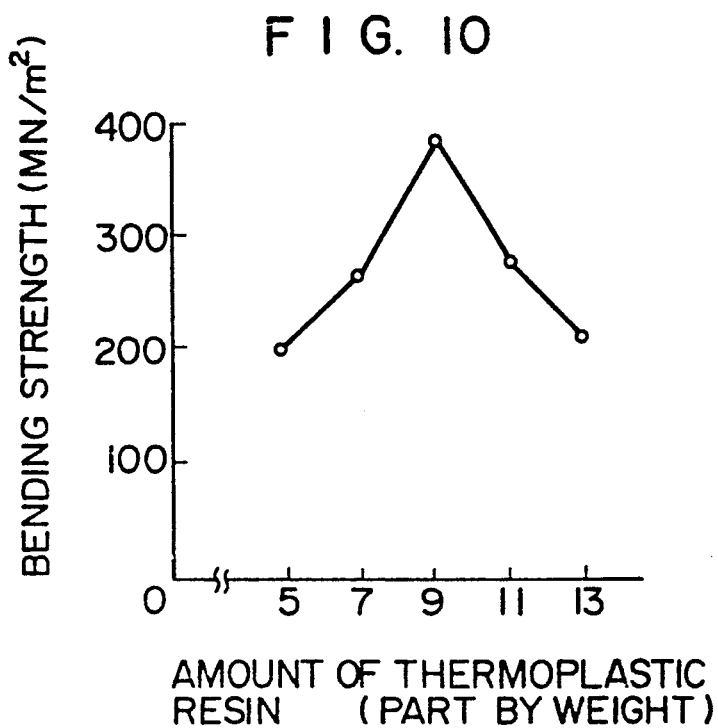
FIG. 10 is a graph which shows the relation between amount of binder resin and bending strength in the SECOND ASPECT of the present invention.
Figure 11:
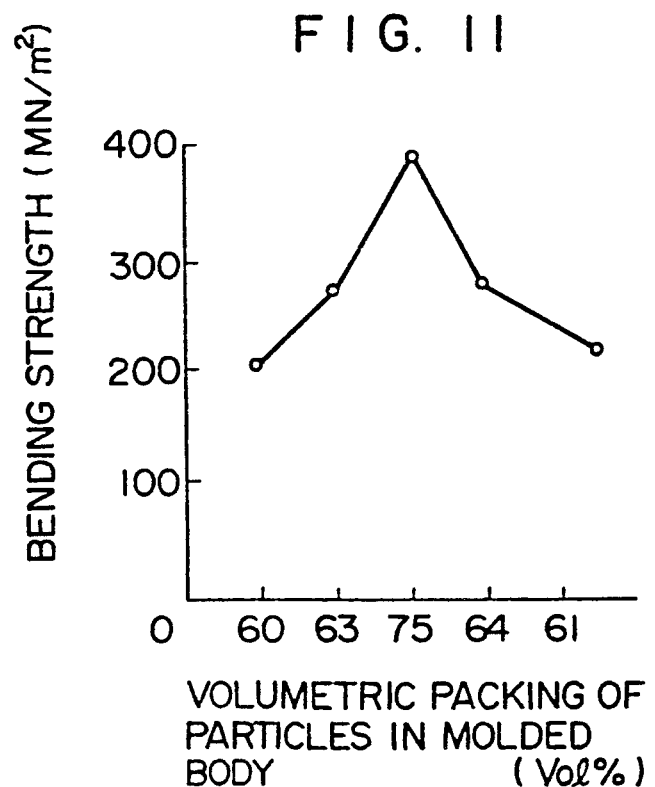

Next, relation between amount of binder resin and bending strength with amount of Si being 60 vol % is shown in FIGS. 10 and 11, from which it can be seen that amount of binder resin has a great effect on bending strength. This is influenced by volumetric packing of molded body.

The raw material powder per se are fragile solid fine powder particles and are difficult to pack by pressing them as such. Therefore, it is necessary to add binder thereto to accelerate fluidity of powders and besides to increase strength of molded body. Strength of sintered body changes depending on addition amount of binder and as mentioned hereinbefore, this has a relation with volumetric packing of powders of molded body (density). With increase of amount of binder, fluidity of mixture under heating increases and pressure molding becomes easy. As a result, volumetric packing of particles of molded body is improved. However, if binder is added in an amount more than the vacancy when raw material powders are in ideal dense packing, the raw material powders are isolated in the binder and fluidity is increased, but solid ratio in the molded body is decreased, resulting in decrease of volumetric packing of particles of the molded body. Thus, void content of sintered body increases and this causes reduction of strength of sintered body.

As mentioned before, when the molded body is sintered in nitriding atmosphere, whiskers produced from Si powders connect particles and besides fill the vacancy between the particles and grow three-dimensionally in sintered body. Thus, ceramics of high toughness can be obtained.

In the ceramics of the present invention, particles in the molded body of at least 70 vol % in volumetric packing of particles are connected by nitride produced from metallic Si powders and hence, dimensional change on sintering is small and no deformation occurs.

In the present invention, particles and whiskers produced from metallic Si are preferably nitride. Oxynitride and oxide tend to decrease high-temperature strength.

According to the present invention, ceramics of less than 0.2% in dimensional change on sintering and having a bending strength of about 300 $MN/m^2$ or more can be obtained by near net shaping. Such ceramics require substantially no mechanical working after sintering and can be applied to various fields of structural parts such as engines and turbines.

THIRD ASPECT

The present invention relates to a sliding member for sealing wherein one surface of sliding surfaces comprises ceramics composed of SiC and $Si_3N_4$ as a composite material and this composite material, $Si_3N_4$ contains at least one of particles and whiskers and said ceramics have void and besides, another surface of the sliding surfaces has a hardness smaller than that of the composite material of said surface.

In the present invention, $Si_3N_4$ particles or whiskers for bonding SiC are preferably those produced by heat treatment of metallic Si. They bond particles and reduce vacancy between the particles. Thus, sintered body having open voids of 2-30% in void content and 100 μm or less in diameter can be obtained.

In the present invention, it is preferred that average particle size of SiC particles is 100 μm or less, average aspect ratio of SiC whiskers is 200 or less and average length of SiC whiskers is 200 μm or less. Outside these ranges, mixing of raw materials is difficult and dispersion is not uniform, resulting in reduction of mechanical strength.

The reason why one surface of seal sliding member is made of a composite material of SiC and $Si_3N_4$ in the present invention is that a sliding material having the characteristics of both the SiC and $Si_3N_4$ can be obtained and unexpectedly excellent thermal shock resistance can be obtained by bonding SiC superior in wear resistance, hardness and thermal conductivity with $Si_3N_4$ low in thermal expansion coefficient. The reason why another surface is made of a composition having a hardness lower than that of SiC particles and $Si_3N_4$ particles of the other sliding surface is that if it is harder than the sliding surface comprising SiC and $Si_3N_4$ and voids, SiC and $Si_3N_4$ are worn by the harder particles of another surface and fall off between the sliding surfaces to cause wear due to scratch. When materials of compositions having particles of same hardness are combined and slidden, marks are apt to be formed on the sliding surface. This is because even if the sliding surface is mirror-polished, the contact is microscopically point or line contact and the surfaces are in the state of one-side contacting and this naturally forms sliding marks. On the other hand, according to the present invention, another surface is made of a material having a hardness lower than that of SiC and $Si_3N_4$ particles and thus, substantially no wear is caused on one surface and a sliding material superior in wear resistance can be obtained. By employing a material for one sliding surface which is softer than another sliding surface, even if one-side contact occurs, one surface of lower hardness is mirror-polished with the harder surface by sliding and so the period of the state of one-side contact is short and a sliding material superior in sealing property can be obtained.

The reason why one surface of seal sliding surfaces is made of a ceramic sintered body having open voids of 2-30% in void content is that said open voids relax thermal shock strain to provide a sliding material of unexpectedly superior thermal shock resistance. When diameter of voids is more than 100 μm and void content is more than 30%, mechanical strength decreases and besides bonding strength between SiC and produced $Si_3N_4$ phase decreases, resulting in considerable falling-off of SiC and $Si_3N_4$ particles during sliding. Further, breakage of lubricant oil film does not occur due to these open voids and so cohesion and scorch are not caused. This is because lubricant oil penetrates into the open voids and oozes out on the sliding surface to give the above effects. Therefore, as far as one surface is made of the ceramics of the present invention, another surface may be of metals, ceramics, carbon or synthetic resins lower in hardness than the particles of said one surface. It has been confirmed by experiments that especially, when oxide ceramics are used as the partner material (another material), sliding characteristics are improved. This is because SiC and $Si_3N_4$ are high in covalent bonding and when amount of adsorbates on the surface decreases, cohesion is apt to occur. However, if the partner surface is made of oxide, oxygen ion is produced on the sliding surface to produce surface adsorbates which prevent the cohesion.

In the present invention, in case SiC contained in ceramics composed of SiC, $Si_3N_4$ and voids is greater than the particles of whiskers of $Si_3N_4$ or the like produced from metallic Si powders, the material is better in wear resistance and thermal shock resistance. Especially, because of composite ceramics, thermal shock resistance is superior to that of other ceramics having the same void content.

The characteristics are further improved when a solid lubricant or resin such as furan resin is contained in the void of sintered body.

According to the present invention, one surface of sliding surfaces of sliding member for sealing is made of ceramics composed of at least one of particles and whiskers of SiC and $Si_3N_4$ and voids and another surface (partner surface) is made of a material having a hardness lower than that of particles or whiskers of $Si_3N_4$ of said one surface, whereby excellent wear resistance, corrosion resistance and thermal shock resistance can be obtained and wear of a partner material can be reduced and hence, performance of various seals can be markedly improved.

As explained hereinabove, according to the present invention, the sliding members have extremely excellent sliding properties such as wear resistance and thermal shock resistance and so, endurance and reliability of seal can be remarkably improved. This is effective for various sliding mechanisms such as mechanical seal, floating seal, plain bearing and the like.

EXAMPLE 1

To 100 parts by weight of a raw material comprising 22.7 wt. % of metallic Si powder of 0.9 μm in average particle size and 77.3 wt. % of TiN powder of 1.2 μm in average particle size was added 9 parts by weight of binder comprising polyethylene based thermoplastic resin and stearic acid and the mixture was kneaded at 160° C. for 12 hours by a pressure kneader. The kneaded product was pulverized to 10 meshes or less to obtain a raw material for electrical conductor ceramics A.

To 100 parts by weight of raw material comprising 38 wt. % of metallic Si powder of 0.9 μm in average particle size and 62 wt. % of $Al_2O_3$ of 2 μm in average particle size was added 9 parts by weight of a binder comprising a low-density polyethylene, a synthetic wax and stearic acid and the mixture was kneaded at 160° C. for 12 hours by a pressure kneader. The kneaded product was pulverized to 10 meshes or less to obtain a raw material for insulant ceramics B.

Figure 1B:
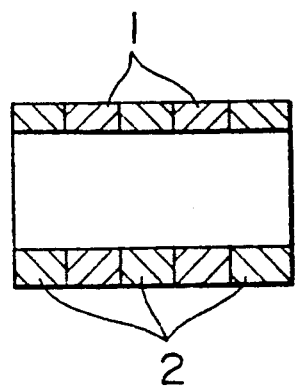

Then, the raw materials for ceramics A and B were filled in succession in a mold at 160° C. and under 1000 kg/cm² to obtain a layered ring as shown in FIG. 1(A) and FIG. 1(B). FIG. 1(B) is a cross-sectional view of FIG. 1(A) at Z—Z. This molded ring was heated to 500° C. at 3° C./h to remove the binder therein and then, was heated to 1100° C. at 5° C./min in a nitrogen atmosphere and then, from 1100° C. to 1350° C. at 4° C./h to obtain a sintered body having whisker/particle of $Si_3N_4$ of 1/9.

Figure 2:
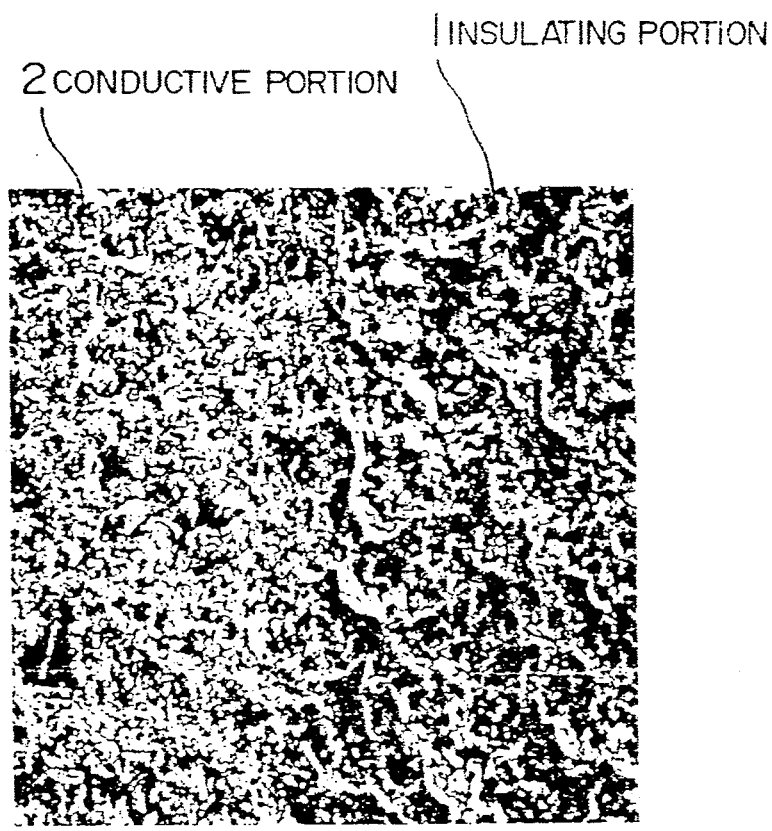
FIG. 2 is a micrograph of crystal grains of the sintered body comprising a conductive portion and an insulating portion of a ceramic composite according to the FIRST ASPECT of the present invention.

The ratio of whisker/particle can be adjusted by changing the rate of heating of from 1100° C.-1400° C. and retaining stepwise the temperature during the heating. The ratio of whisker/particle can be obtained by observation of the sintered body under scanning electron microscope and transmission electron microscope. The characteristics of the obtained sintered body are shown in Table 1. Rate of dimensional change when molded product was sintered was small, namely, ±0.2 and no cracks occurred. Resistivity of the portion of ceramics A was $9 \times 10^{-4}$ Ω cm and that of the portion of ceramics B was $7 \times 10^{13}$ Ω cm. FIG. 2 shows an electron micrograph of around the boundary between the conductive portion and the insulating portion. It can be seen that the conductive portion and the insulating portion were firmly bonded. This bonding is due to $Si_3N_4$ produced from metallic Si.

TABLE 1

| Ex-am-ple | Cer-amics | Composition of sintered body (vol %) | | | Void (%) | Resis-tivity (Ω cm) | Bending strength (MPa) |
|---|---|---|---|---|---|---|---|
| | | $Si_3N_4$ | TiN | $Al_2O_3$ | | | |
| 1 | A | 40 | 60 | — | 22 | $9 \times 10^{-4}$ | 280 |
| | B | 50 | — | 50 | 18 | $7 \times 10^{13}$ | 270 |

The coefficient of thermal expansion of the conductive portion was $5.2 \times 10^{-6°}$ $C.^{-1}$ and that of the insulating portion was $5.1 \times 10^{-6°}$ $C.^{-1}$ and these were nearly the same. This also indicates superior thermal shock resistance of the sintered body.

EXAMPLES 2-36

Sintered bodies were prepared in the same manner as in Example 1 except that the conductive particles were used in place of TiN particle. The results are shown in Table 2. Composition of the sintered bodies was not shown in Table 2 because composition of insulating portion B of the sintered body was $Si_3N_4 Al_2O_3 = 50:50$ (vol %) as in Example 1.

Rate of dimensional change of from molded product to sintered body was small, namely, less than +0.2% and no cracks occurred. Conductive portion A and insulating portion B were firmly bonded at their boundary as in Example 1.

Furthermore, integral molding and sintering with optional combination of resistivity of from $10^{14}$ Ω cm to $10^{-5}$ Ω cm are possible by allowing a conductive compound and an insulating compound to be present together.

TABLE 2

| Ex-am-ple No. | Raw material ratio (wt. %) | | Void con-tent (%) | Resis-tivity (Ω cm) | Bending strength (MPa) | Appear-ance |
|---|---|---|---|---|---|---|
| | Si | Electro-conductive particles | | | | |
| 2 | 20 | TiC80 | 28 | $5 \times 10^{-3}$ | 161 | No cracks |
| 3 | 20 | $TiB_2$80 | 29 | $2 \times 10^{-3}$ | 145 | " |
| 4 | 20 | ZrN80 | 27 | $1 \times 10^{-3}$ | 155 | " |
| 5 | 5 | ZrC95 | 30 | $2 \times 10^{-5}$ | 101 | " |
| 6 | 20 | $ZrB_2$80 | 28 | $5 \times 10^{-3}$ | 138 | " |
| 7 | 20 | $Cr_2$N80 | 20 | $7 \times 10^{-3}$ | 167 | " |
| 8 | 20 | $Cr_3C_2$80 | 21 | $5 \times 10^{-3}$ | 161 | " |
| 9 | 20 | CrB80 | 21 | $6 \times 10^{-3}$ | 147 | " |
| 10 | 20 | HfN80 | 23 | $8 \times 10^{-3}$ | 161 | " |
| 11 | 90 | HfC10 | 12 | $3 \times 10^{2}$ | 355 | " |
| 12 | 20 | TaN80 | 26 | $6 \times 10^{-3}$ | 151 | " |
| 13 | 20 | TaC80 | 23 | $4 \times 10^{-5}$ | 162 | " |
| 14 | 20 | $TaB_2$80 | 27 | $4 \times 10^{-3}$ | 155 | " |
| 15 | 20 | $Mo_2$N80 | 22 | $8 \times 10^{-3}$ | 171 | " |
| 16 | 20 | $Mo_2$C80 | 22 | $7 \times 10^{-4}$ | 162 | " |
| 17 | 20 | MoB80 | 27 | $6 \times 10^{-3}$ | 143 | " |
| 18 | 20 | NbN80 | 23 | $6 \times 10^{-3}$ | 153 | " |
| 19 | 25 | NbC75 | 27 | $6 \times 10^{-3}$ | 195 | " |
| 20 | 25 | $NbB_2$75 | 26 | $5 \times 10^{-3}$ | 191 | " |
| 21 | 5 | WC95 | 30 | $3 \times 10^{-5}$ | 108 | " |
| 22 | 22 | $W_2$C78 | 28 | $3 \times 10^{-3}$ | 178 | " |
| 23 | 25 | TiB75 | 24 | $4 \times 10^{-3}$ | 185 | " |
| 24 | 20 | VN80 | 22 | $6 \times 10^{-3}$ | 182 | " |
| 25 | 30 | $WSi_2$70 | 22 | $8 \times 10^{-4}$ | 225 | " |
| 26 | 90 | $TiSi_2$10 | 13 | $3 \times 10^{3}$ | 345 | " |
| 27 | 90 | $ZrSi_2$10 | 13 | $8 \times 10^{3}$ | 365 | " |
| 28 | 90 | $NbSi_2$10 | 13 | $6 \times 10^{3}$ | 350 | " |
| 29 | 90 | $TaSi_2$10 | 13 | $6 \times 10^{3}$ | 351 | " |
| 30 | 90 | $CrSi_2$10 | 12 | $1 \times 10^{4}$ | 365 | " |
| 31 | 90 | $MoSi_2$10 | 14 | $5 \times 10^{3}$ | 362 | " |
| 32 | 80 | VC20 | 14 | $2 \times 10^{1}$ | 360 | " |
| 33 | 75 | $Fe_3$C15 | 13 | $8 \times 10^{1}$ | 358 | " |
| 34 | 90 | ThC10 | 13 | $3 \times 10^{2}$ | 358 | " |
| 35 | 90 | $CeC_2$10 | 13 | $5 \times 10^{2}$ | 362 | " |
| 36 | 95 | $Cr_7C_2$5 | 13 | $4 \times 10^{3}$ | 360 | " |

COMPARATIVE EXAMPLES 1-2

For comparison, a molded product was produced in the same manner as in Example 1 except that $Si_3N_4$ powder of 0.8 μm in average particle size was used in place of metallic Si powder and this was sintered by a hot press under 150 kg/cm² at 1800° C. for 4 hours under vacuum to obtain a sintered body. Separately, a molded product was produced in the same manner as in Example 1 with addition of 3 vol % of $Y_2O_3$ and 3 vol % of AlN as sintering aids and this was sintered at 1800° C. for 4 hours under low-pressure in nitrogen atmosphere. Characteristics of the resulting sintered bodies are shown in Table 3.

TABLE 3

| Comparative Examples | Ceramics | Composition of sintered body (vol %) | | | State of sintered body | Void content (%) | Resistivity (Ω cm) | Bending strength (MPa) |
|---|---|---|---|---|---|---|---|---|
| | | $Si_3N_4$ | TiN | $Al_2O_3$ | | | | |
| 1 Hot pressing | A | 40 | 60 | — | Cracks | 4 | $7 \times 10^{-4}$ | Unmeasurable |
| | B | 50 | — | 50 | Good | 4 | $8 \times 10^{10}$ | 330 |
| 2 Pressureless sintering | A | 37.6 | 56.4 | — | Cracks and deformation | 2 | $8 \times 10^{-4}$ | Unmeasurable |
| | B | 48 | — | 48 | Deformation | 2 | $8 \times 10^{10}$ | 380 |

Both the hot press sintered body and pressureless sintered body cracks and good ceramic composites were not able to be obtained. It is considered that cracks or deformation do not occur in the products of the present invention because sintering temperature is low and there are open voids and thus stress caused by difference in coefficient of thermal expansion is relaxed.

EXAMPLES 37–43

To 100 parts by weight of raw materials comprising a mixture of metallic Si powder of 0.9 μm in average particle size and TiN powder of 1.2 μm in average particle size at the ratio as shown in Table 4 was added 9 parts by weight of a binder comprising a polyethylene based thermoplastic resin and stearic acid and the mixture was kneaded at 160° C. for 12 hours by a pressure kneader. The kneaded product was pulverized to 10 meshes or less and this was used as a raw material for conductor ceramics A. Separately, to 100 parts by weight of a raw material comprising a mixture of metallic Si powder of 0.9 μm in average particle size and $Al_2O_3$ powder of 2 μm in average particle size at the ratio as shown in Table 4 was added 9 parts by weight of a binder comprising a polyethylene based thermoplastic resin and stearic acid and the mixture was kneaded by a pressure kneader at 160° C. for 12 hours. The kneaded product was pulverized to 10 meshes or less and this was used as a raw material for insulant ceramics B.

Figure 3A:
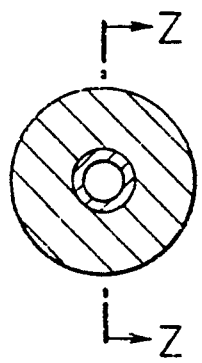
FIGS. 3(A) and 3(B) are schematical cross-sectional views of another embodiment according to the FIRST ASPECT of the present invention.
Figure 3B:
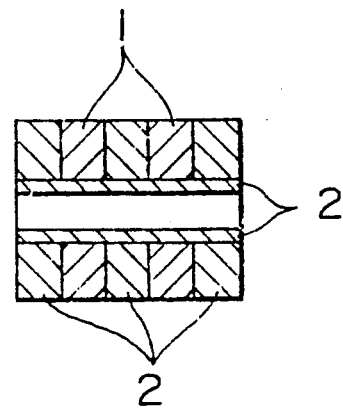

Then, the raw materials for A and B were filled in succession in a mold to produce a layered ring as shown in FIG. 3(A) and FIG. 3(B). FIG. 3(B) is cross-sectional view of FIG. 3(A) at Z—Z. After removal of the binder, the molded product was heated to 1100° C. at 5° C./min in nitrogen atmosphere and then heated from 1100° C. to 1350° C. at a rate of 3° C./h over a long period of time to obtain a sintered body of whisker/particle of $Si_3N_4 = 2/9$. Characteristics of the thus obtained sintered body are shown in Table 4.

TABLE 4

| Example No. | Ceramics | Composition of sintered body (vol %) | | | Void content (%) | Resistivity (Ω cm) | Bending strength (MPa) |
|---|---|---|---|---|---|---|---|
| | | $Si_3N_4$ | TiN | $Al_2O_3$ | | | |
| 37 | A | 95 | 5 | — | 8 | $4 \times 10^5$ | 420 |
| | B | 90 | — | 10 | 13 | $8 \times 10^{13}$ | 400 |
| 38 | A | 90 | 10 | — | 13 | $2 \times 10^3$ | 403 |
| | B | 90 | — | 10 | 12 | $8 \times 10^{13}$ | 400 |
| 39 | A | 80 | 20 | — | 14 | $9.7 \times 10^0$ | 395 |
| | B | 80 | — | 20 | 14 | $6 \times 10^{12}$ | 390 |
| 40 | A | 60 | 40 | — | 16 | $3.1 \times 10^{-3}$ | 380 |
| | B | 60 | — | 40 | 16 | $8 \times 10^{13}$ | 380 |
| 41 | A | 40 | 60 | — | 20 | $9 \times 10^{-4}$ | 280 |
| | B | 40 | — | 60 | 18 | $7 \times 10^{12}$ | 250 |
| 42 | A | 20 | 80 | — | 23 | $2.1 \times 10^{-4}$ | 180 |
| | B | 30 | — | 80 | 21 | $8 \times 10^{13}$ | 206 |
| 43 | A | 5 | 95 | — | 30 | $8 \times 10^{-5}$ | 103 |
| | B | 20 | — | 80 | 26 | $7 \times 10^{13}$ | 158 |

Thus, according to the present invention, integrally molded and sintered ceramics comprising layers different in resistivity can be obtained by changing addition amount of the electrically conductive compound.

Figure 4:
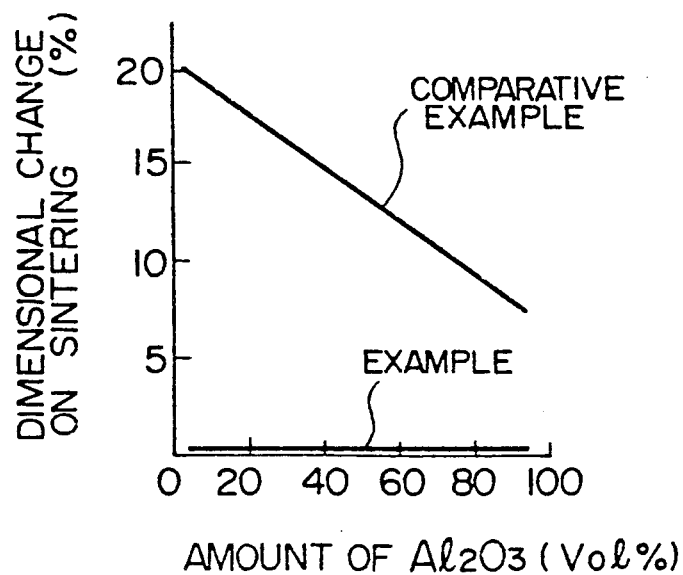
FIG. 4 is a graph which shows the relation between contents of TiN and $Al_2O_3$ and dimensional change on sintering in the FIRST ASPECT of the present invention.

FIG. 4 is a graph which shows relation between content of TiN and volume change on sintering and relation between content of $Al_2O_3$ and volume change on sintering.

As comparative example, molding and sintering were effected in the same manner as in Comparative Example 2 except that the composition of sintered body was as in Examples 37–43 and volume change on sintering is also shown in FIG. 4.

According to FIG. 4, the products of the present invention are superior sintered bodies which are extremely smaller in dimensional change than the pressureless sintered products and free from cracks.

Figure 5:
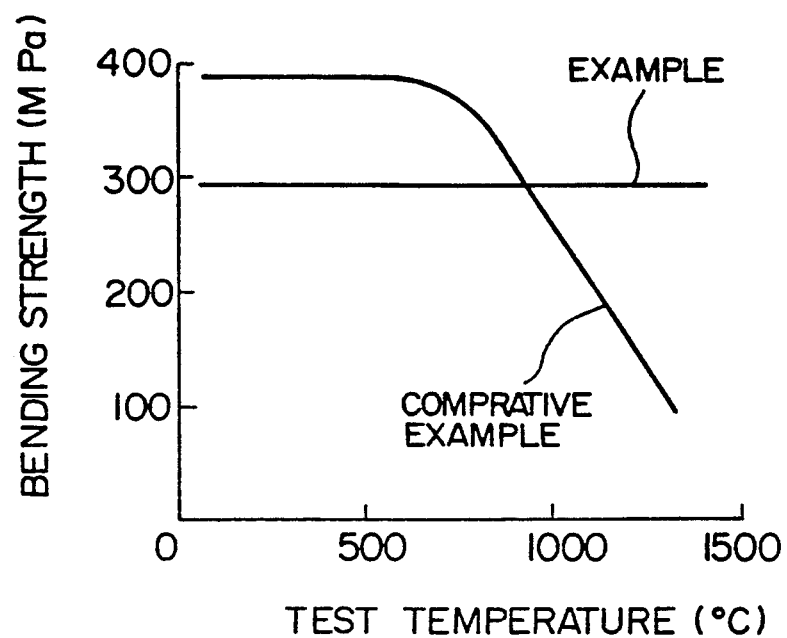
FIG. 5 is a graph which shows the relation between bending strength and temperature in the FIRST ASPECT of the present invention.

FIG. 5 shows relation between bending strength and test temperature.

According to FIG. 5, the products of the present invention showed no reduction in strength even at high temperatures. On the other hand, since the comparative products contained sintering aids, there exists a glass phase, which is softened at high temperature, resulting in reduction in strength at high temperatures.

EXAMPLE 44

To 100 parts by weight of a raw material comprising a mixture of 50 vol % (in terms of $Si_3N_4$) of ferro-Si powder (average particle size 2 μm) and 50 vol of ZrN powder (average particle size 2 μm) was added 10 parts by weight of a polysilane compound as a binder. From this mixed powder, ceramics A was prepared in the same manner as in Example 1. Ceramics B was prepared in the same manner as in Example 1 except that 10 parts teristics of the resulting sintered body are shown in Table 5.

TABLE 5

|  | No. | Ceramics | Composition of sintered body (vol %) | | | | Void content (%) | Resistivity (Ω cm) | Bending strength (MPa) | Thermal shock resistance (times) |
| --- | --- | --- | --- | --- | --- | --- | --- | --- | --- | --- |
|  |  |  | $Si_3N_4$ | $Si_3N_4$ Whisker | TiN | $Al_2O_3$ |  |  |  |  |
| Examples | 46 | A | 39.6 | 0.4 | 60 | — | 21 | $9 \times 10^{-4}$ | 280 | 45 |
|  |  | B | 49.5 | 0.5 | — | 50 | 20 | $7 \times 10^{13}$ | 272 | 45 |
|  | 47 | A | 32 | 8 | 60 | — | 21 | $9 \times 10^{-4}$ | 281 | 47 |
|  |  | B | 40 | 10 | — | 50 | 19 | $7 \times 10^{13}$ | 273 | 47 |
|  | 48 | A | 24 | 16 | 60 | — | 21 | $9 \times 10^{-4}$ | 280 | 50 |
|  |  | B | 30 | 20 | — | 50 | 19 | $7 \times 10^{13}$ | 270 | 50 |
|  | 49 | A | 16 | 24 | 60 | — | 22 | $9 \times 10^{-4}$ | 270 | 52 |
|  |  | B | 20 | 30 | — | 50 | 20 | $7 \times 10^{13}$ | 270 | 52 |
|  | 50 | A | 12 | 28 | 60 | — | 22 | $9 \times 10^{-4}$ | 265 | 48 |
|  |  | B | 15 | 35 | — | 50 | 22 | $7 \times 10^{13}$ | 245 | 48 |
| Comparative Examples | 3 | A | 39.76 | 0.24 | 60 | — | 22 | $9 \times 10^{-4}$ | 280 | 38 |
|  |  | B | 49.7 | 0.3 | — | 50 | 23 | $7 \times 10^{13}$ | 275 | 38 |
|  | 4 | A | 8 | 32 | 60 | — | 23 | $9 \times 10^{-4}$ | 221 | 33 |
|  |  | B | 10 | 40 | — | 50 | 23 | $7 \times 10^{13}$ | 220 | 33 | by weight of a polysilane compound was used as a binder. These powders were molded in the same manner as in Example 1 and the molded product was heated to as high as 1450° C. with stepwise retention of time in nitrogen atmosphere to obtain a sintered body.

Characteristics of the resulting ceramics composite were relative density: 93%; resistivity: $4 \times 10^{-3}$ Ω cm; bending strength: 420 MPa and dimensional change on sintering: +3.8%.

EXAMPLE 45

Sintered bodies were produced in the same manner as in Example 44 with changing the particle size of the raw material ferro-Si powder and relation between the particle size and bending strength was examined.

Figure 6:
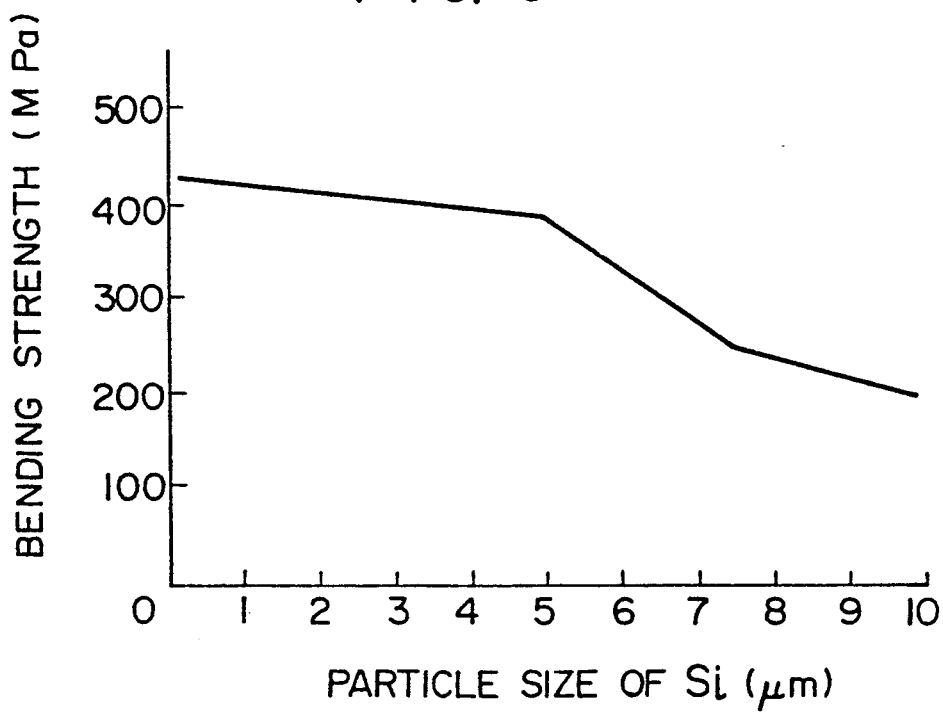
FIG. 6 is a graph which shows the relation between particle size of metallic Si and bending strength in the FIRST ASPECT of the present invention.

The results are shown in FIG. 6. Si particle size of 5 μm or less is preferred.

It is considered that when the particle size exceeds 5 μm, unnitrided Si remains in sintered body and this is evaporated by heating, resulting in reduction of strength.

EXAMPLES 46-50 AND COMPARATIVE EXAMPLES 3 AND 4

Molded products were prepared in the same manner as in Example 1. They were sintered with changing heating rate and changing stepwise heating time from 1100° C. to 1400° C., thereby to obtain sintered bodies adjusted in amount of $Si_3N_4$ whisker produced. Charac- From the above, it can be seen that the products of the present invention where $Si_3N_4$ whisker was present in an amount of 1-70 vol % of $Si_3N_4$ phase produced from Si were superior in thermal shock resistance.

The thermal shock resistance was evaluated as follows: A sintered body was kept at 1200° C. for 30 minutes and then introduced it into water to quench. This was repeated until cracks occurred and the number of the repetition was taken as thermal shock resistance value.

EXAMPLES 51-57

Molded products were prepared in the same manner as in Example 1 and sintered bodies were obtained therefrom wherein amounts of $Si_3N_4$, $Si_2N_2O$ and $SiO_2$ in the phase produced from Si by changing oxygen partial pressure in nitriding gas. Characteristics of the sintered bodies are shown in Table 6.

TABLE 6

| Example No. | Ceramics | Composition of sintered body (vol %) | | | | | Resistivity (Ω cm) | Bending strength (MPa) | Thermal shock resistance (times) |
| --- | --- | --- | --- | --- | --- | --- | --- | --- | --- |
|  |  | $Si_3N_4$ | $Si_2N_2O$ | $SiO_2$ | TiN | $Al_2O_3$ |  |  |  |
| 51 | A | 40 | 0 | 0 | 60 | — | $9 \times 10^{-4}$ | 280 | 45 |
|  | B | 50 | 0 | 0 | — | 50 | $7 \times 10^{13}$ | 270 | 45 |
| 52 | A | 36 | 4 | 0 | 60 | — | $9 \times 10^{-4}$ | 280 | 45 |
|  | B | 45 | 5 | 0 | — | 50 | $7 \times 10^{13}$ | 270 | 45 |
| 53 | A | 24 | 16 | 0 | 60 | — | $9 \times 10^{-4}$ | 280 | 47 |
|  | B | 30 | 20 | 0 | — | 50 | $7 \times 10^{13}$ | 272 | 47 |
| 54 | A | 20 | 16 | 4 | 60 | — | $3 \times 10^{-3}$ | 260 | 40 |
|  | B | 25 | 20 | 5 | — | 50 | $5 \times 10^{14}$ | 260 | 40 |
| 55 | A | 0 | 32 | 8 | 60 | — | $8 \times 10^{-3}$ | 251 | 28 |
|  | B | 0 | 40 | 10 | — | 50 | $8 \times 10^{14}$ | 253 | 28 |
| 56 | A | 0 | 4 | 36 | 60 | — | $2 \times 10^{-2}$ | 205 | 20 |
|  | B | 0 | 5 | 45 | — | 50 | $8 \times 10^{14}$ | 210 | 20 |
| 57 | A | 0 | 0 | 40 | 60 | — | $4 \times 10^{-2}$ | 191 | 15 |
|  | B | 0 | 0 | 50 | — | 50 | $9 \times 10^{14}$ | 198 | 15 |

From the above, it is seen that when amounts of $Si_2N_2O$ and $SiO_2$ are larger than that of $Si_3N_4$ in the phase produced from Si, resistivity and thermal shock resistance tend to decrease.

EXAMPLES 58-61

Sintered bodies were prepared in the same manner as in Example 1 except that the raw materials as shown in Table 7 were used in place of TiN and $Al_2O_3$ particles. The results are shown in Table 7.

According to the present invention, integral molding and sintering with optional combination of resistivities within the range of $10^{14}$ Ω cm to $10^{-5}$ Ω cm are possible by compositely combining conductive compound and insulating compound.

TABLE 7

| Example No. | Ceramics | Raw material ratio (wt. %) | Resistivity (Ω cm) | Bending strength (MPa) |
|---|---|---|---|---|
| 58 | A | Si(25), TiC(10), ZrN(65) | $5 \times 10^{-3}$ | 182 |
|    | B | Bi(30), TiN(30), SiC(40) | $1 \times 10^{-1}$ | 205 |
| 59 | A | Si(50), ZrO₂(10), Cr₂N(40) | $2 \times 10^{-2}$ | 275 |
|    | B | Si(30), Al₂O₃(50), Si₃N₄(20) | $4 \times 10^{13}$ | 232 |
| 60 | A | Si(30), B₄C(10), TiC(60) | $8 \times 10^{-3}$ | 205 |
|    | B | Si(30), Si₂N₂O(10), ZrO₂(60) | $3 \times 10^{13}$ | 213 |
| 61 | A | Si(30), TiSi₂(5), WC(65) | $4 \times 10^{-4}$ | 189 |
|    | B | Si(30), CrB(5), Al₂O₃(65) | $2 \times 10^{2}$ | 193 |

EXAMPLE 62

Si₃N₄/TiN conductive ceramics and Si₃N₄/Al₂O₃ insulating ceramics obtained in Example 1 were integrally molded and sintered as shown in FIG. 3(A) and FIG. 3(B) as current collector for alternator of automobiles. Current collecting characteristics thereof were examined. The results are shown in Table 8. From the results, it can be seen that the product of the present invention is superior to the conventional copper/heat resisting resin in heat resistance and wear resistance.

TABLE 8

|  |  | Example 62 | Comparative Example 5 |
|---|---|---|---|
| Current Collecting ring | Conductive portion | Si₃N₄/TiN | Copper |
|  | Insulating portion | Si₃N₄/Al₂O₃ | Heat resisting resin |
| Current collector |  | Carbon | Carbon |
| State of sliding surface | Current collecting ring | Gloss | Blackish brown |
|  | Current collector | Gloss | Scratch |
| Damage | Current Collecting ring | 1–3 μm | 10–20 μm |
|  | Current collector | ≈0 | 0.82 |
| Spark |  | No | No |
| State after test |  | No change | Scorching mark in the insulating portion Blackening of copper portion |

Condition: 30,000 rpm
Current density of current collector 70 A/cm²

Example 63

Figure 7A:
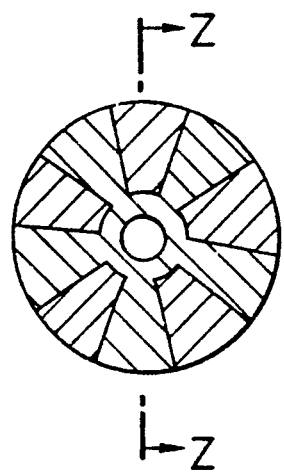
FIGS. 7(A) and 7(B) are schematical cross-sectional views of a further embodiment according to the FIRST ASPECT of the present invention.
Figure 7B:
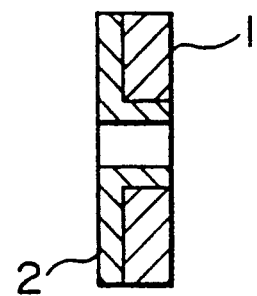

Si₃N₄/TiN conductive ceramics and Si₃N₄/Al₂O₃ ceramics obtained in Example 1 were integrally molded and sintered as shown in FIG. 7(A) and FIG. 7(B) as a commutator for starter motor of automobiles. Current collecting characteristics were examined. As in Example 63, it has been confirmed that the product of the present invention is superior to the conventional copper/heat resisting resin in heat resistance and wear resistance and production of non-combustible motor is possible.

EXAMPLE 64

To 100 parts by weight of raw material comprising a mixture of 22.7 wt. % of metallic Si powder of 0.5 μm in average particle size and 77.3 wt. % of TiN whisker of 50 in aspect ratio and 50 μm in length was added 9 parts by weight of binder comprising a low-density polyethylene, a synthetic wax and stearic acid and the mixture was kneaded by a pressure kneader at 160° C. for 12 hours. The kneaded product was pulverized to 10 meshes or less and this was used as a conductor ceramics A.

Separately, to 100 parts by weight of raw material comprising a mixture of 38 wt. % of metallic Si powder of 0.9 μm in average particle size and 62 wt. % of Al₂O₃ of 35 μm in average particle size was added 9 parts by weight of the above binder. The mixture was kneaded and pulverized in the same manner as above and this was used as a raw material for insulant ceramics B. In the same manner as in Example 1, a composite sintered body was prepared using these ceramics A and B.

Dimensional change of this sintered body was ±0.2. The portion A had a resistivity of $7 \times 10^{-4}$ Ω cm, a void of 18%, a bending strength of 291 MPa and a coefficient of thermal expansion of $5.2 \times 10^{-6}$. The portion B had a resistivity of $5 \times 10^{13}$ Ω cm, a void of 20%, a bending strength of 250 MPa and a coefficient of thermal expansion of $5.1 \times 10^{-6}$.

EXAMPLES 65–70

To 500 g of a mixed powder comprising SiC particle of 16 μm in average particle size and metallic Si of 0.9 μm in average particle size at the ratio as shown in Table 8 was added 8–12 parts by weight of a molding binder comprising 21% of polyethylene (melt index 1.5), 43% of polyethylene wax (PE-520 manufactured by Hoecht, Japan) 21% of blend wax (D-556 manufactured by Chukyo Yushi Co.) and 15% of stearic acid and the mixture was kneaded in a pressure kneader at 160° C. for 5 hours. The kneaded product was crushed to obtain a raw material under test. This raw material was molded into a molded body of 50 mm in diameter and 20 mm thick by a mechanical press at 160° C. under a molding pressure of 1000 kgf/cm². Volumetric packing of particle of the resulting molded body was at least 70 vol %. This molded body from which the molding binder had been removed was heated from 1100° C. to 1350° C. at a rate of 4° C./h in a nitrogen atmosphere, whereby a sintered body with whisker/particle of Si₃N₄ of 1/9 was obtained. The blending ratio of whisker/particle can be adjusted by changing heating rate and retention time. The ratio of whisker/particle can be obtained by observation of the sintered body under scanning electron microscope and transmission electron microscope.

Characteristics of the thus obtained sintered body are shown in Table 8. The breaking toughness was measured by notched beam method using a test piece of 3×4×40 mm having a notch of 0.5 mm made by a diamond wheel. For the thermal shock, the sintered body was kept at 1250° C. for 30 minutes and then introduced it into water to quench it. This was repeated until cracks occurred and the thermal shock was evaluated by the number of the repetition.

Next, mixed powder of the compositions as shown in Comparative Examples 65-70 of Table 9 was prepared. This mixed powder contained $Y_2O_3$ as a sintering aid. This was molded in the same manner as above and sintered at 1700° C. for 5 hours to obtain a sintered body. Characteristics of the obtained sintered body are shown in Table 9.

FIG. 8 shows the relation between the content of SiC and the rate of dimensional change on sintering. The product (A) of the present invention is a markedly superior sintered body with very small rate of dimensional change as compared with the product (B) comprising $Si_3N_4$ powder, SiC powder to which sintering aid $Y_2O_3$ was added.

TABLE 8

| Example | Raw-material (vol %) Si | SiC | Volumetric packing of particles in molded product (%) | Composition of sintered body (vol %) $Si_3N_4$ | SiC | Dimensional change on sintering (%) | Bending strength ($MN/m^2$) Room temperature | 1200° C. | Breaking toughness ($MN/m^{3/2}$) | Thermal shock resistance (Times) |
|---|---|---|---|---|---|---|---|---|---|---|
| 65 | 100 | 0 | 72 | 100 | 0 | 0.13 | 584 | 582 | 5 | 43 |
| 66 | 90 | 10 | 75 | 90 | 10 | 0.12 | 512 | 510 | 6 | 45 |
| 67 | 80 | 20 | 74 | 80 | 20 | 0.12 | 490 | 489 | 7 | 50 |
| 68 | 70 | 30 | 73 | 70 | 30 | 0.12 | 430 | 430 | 7 | 50 |
| 69 | 60 | 40 | 75 | 60 | 40 | 0.12 | 390 | 390 | 7 | 50 |
| 70 | 45 | 55 | 74 | 45 | 55 | 0.12 | 310 | 310 | 6 | 49 |

TABLE 9

| Comparative Examples | Composition of sintered body (vol %) $Si_3N_4$ | $Y_2O_3$ | SiC | Bending strength ($MN/m^2$) Room temperature | 1200° C. | Breaking toughness ($MN/m^{3/2}$) | Thermal shock resistance (times) |
|---|---|---|---|---|---|---|---|
| 5 | 93 | 7 | 0 | 753 | 352 | 5 | 21 |
| 6 | 84 | 6 | 10 | 518 | 321 | 3 | 21 |
| 7 | 75 | 5 | 20 | 462 | 255 | 3 | 18 |
| 8 | 66 | 4 | 30 | 391 | 211 | 3 | 17 |
| 9 | 57 | 3 | 40 | 358 | 208 | 3 | 15 |
| 10 | 42 | 3 | 55 | 211 | 127 | 2 | 15 |

EXAMPLES 71-113

Sintered bodies were prepared in the same manner as in Example 69 except that the inorganic compounds shown in Table 10 were used in place of SiC powder. Characteristics of the resulting sintered bodies are shown in Table 10.

It can be seen from Table 10 that the products of the present invention were superior in high-temperature strength, breaking toughness and thermal shock resistance. The rate of dimensional change on sintering was nearly the same as shown by curve (A) in FIG. 8.

TABLE 10

| Examples | Raw material compound in sintered body (40 vol %) | Bending strength ($MN/m^2$) Room temperature | 1200° C. | Void content (%) | Breaking toughness ($MN/m^{3/2}$) | Thermal shock resistance (times) |
|---|---|---|---|---|---|---|
| 71 | TiN | 358 | 351 | 12 | 7 | 48 |
| 72 | $Si_3N_4$ | 362 | 354 | 12 | 5 | 45 |
| 73 | $Si_2N_2O$ | 341 | 330 | 13 | 6 | 48 |
| 74 | TiC | 367 | 358 | 12 | 7 | 48 |
| 75 | $TiO_2$ | 357 | 352 | 12 | 7 | 47 |
| 76 | AlN | 365 | 360 | 11 | 7 | 50 |
| 77 | $Al_2O_3$ | 351 | 343 | 12 | 7 | 48 |
| 78 | $SiO_2$ | 342 | 336 | 13 | 6 | 45 |
| 79 | ZrN | 361 | 356 | 11 | 7 | 51 |
| 80 | $ZrO_2$ | 356 | 345 | 12 | 7 | 49 |
| 81 | ZrC | 356 | 354 | 12 | 7 | 52 |
| 82 | $TiB_2$ | 332 | 330 | 13 | 6 | 48 |
| 83 | $ZrB_2$ | 341 | 335 | 13 | 6 | 48 |
| 84 | $Cr_3C_2$ | 356 | 352 | 12 | 7 | 51 |
| 85 | CrB | 332 | 329 | 13 | 6 | 47 |
| 86 | $Cr_2N$ | 365 | 359 | 11 | 7 | 53 |
| 87 | $Cr_7C_2$ | 355 | 353 | 12 | 7 | 51 |
| 88 | WC | 345 | 341 | 12 | 7 | 47 |
| 89 | $W_2C$ | 346 | 343 | 12 | 7 | 47 |
| 90 | $WSi_2$ | 331 | 330 | 13 | 6 | 45 |
| 91 | $TiSi_2$ | 333 | 328 | 13 | 6 | 45 |
| 92 | $ZrSi_2$ | 338 | 335 | 13 | 6 | 45 |
| 93 | $Fe_3C$ | 362 | 359 | 11 | 8 | 52 |
| 94 | VC | 356 | 346 | 12 | 7 | 49 |
| 95 | VN | 367 | 364 | 11 | 7 | 51 |
| 96 | $CeC_2$ | 367 | 366 | 11 | 7 | 50 |
| 97 | MgO | 336 | 328 | 13 | 6 | 45 |
| 98 | $Mo_2N$ | 349 | 346 | 12 | 7 | 49 |
| 99 | $Mo_2C$ | 365 | 346 | 12 | 7 | 50 |
| 100 | MoB | 336 | 324 | 13 | 6 | 45 |
| 101 | ThC | 368 | 358 | 12 | 7 | 50 |
| 102 | HfN | 359 | 355 | 12 | 7 | 52 |
| 104 | HfC | 357 | 354 | 12 | 7 | 52 |
| 105 | TaN | 349 | 347 | 12 | 7 | 49 |
| 106 | TaC | 347 | 346 | 12 | 7 | 51 |
| 107 | $TaB_2$ | 341 | 332 | 13 | 7 | 46 |
| 108 | NbN | 338 | 331 | 13 | 7 | 47 |
| 109 | BeO | 359 | 358 | 12 | 7 | 50 |
| 110 | WN | 356 | 352 | 12 | 7 | 52 |

TABLE 10-continued

| Examples | Raw material compound in sintered body (40 vol %) | Bending strength (MN/m²) Room temperature | 1200° C. | Void content (%) | Breaking toughness (MN/m^{3/2}) | Thermal shock resistance (times) |
|---|---|---|---|---|---|---|
| 111 | CaO | 352 | 347 | 12 | 7 | 50 |
| 112 | TaSi$_2$ | 335 | 331 | 13 | 7 | 48 |
| 113 | CrSi$_2$ | 332 | 328 | 13 | 7 | 47 |

EXAMPLES 114–117

Sintered bodies were prepared in the same manner as in Example 69 except that the SiC whiskers as shown in Table 11 were used in place of SiC powder. Characteristics of the resulting sintered bodies are shown in Table 11. The rate of dimensional change on sintering was less than 0.13% for all of them. From the results, it will be seen that preferable average aspect ratio of raw material whisker is 200 or less and preferable average length is 200 μm or less.

TABLE 11

| Examples | Raw material whisker in sintered body Average aspect ratio | Average length (μm) | Bending strength room temp. | 1200° C. | Breaking toughness (MN/m^{3/2}) | Thermal resistance (times) |
|---|---|---|---|---|---|---|
| 114 | 180 | 50 | 364 | 356 | 8 | 55 |
| 115 | 50 | 150 | 374 | 375 | 8 | 55 |
| 116 | 230 | 100 | 310 | 305 | 6 | 50 |
| 117 | 50 | 220 | 312 | 310 | 6 | 50 |

EXAMPLE 118–124

Molded products were prepared in the same manner as in Examples 65–70 and then they were sintered with changing stepwise the heating time until 1400° C. in a nitrogen atmosphere thereby to adjust the amount of Si$_3$N$_4$ whisker produced. Test results of the resulting sintered bodies are shown in Table 12. From the results, it can be seen that the products of the present invention where 1–70 vol % of Si$_3$N$_4$ whisker was present for 100 vol % of the produced Si$_3$N$_4$ phase were especially excellent in toughness.

TABLE 12

| Examples | Composition of sintered body (vol %) Si$_3$N$_4$ | Si$_3$N$_4$ whisker | SiC | Bending strength (MN/m²) Room temp. | 1200° C. | Breaking troughness (MN/m^{3/2}) | Thermal shock resistance (times) |
|---|---|---|---|---|---|---|---|
| 118 | 49.5 | 0.5 | 50 | 330 | 334 | 6 | 50 |
| 119 | 40 | 10 | 50 | 332 | 332 | 7 | 50 |
| 120 | 30 | 20 | 50 | 334 | 331 | 7 | 50 |
| 121 | 20 | 30 | 50 | 332 | 331 | 7 | 50 |
| 122 | 15 | 35 | 50 | 335 | 332 | 6 | 50 |
| 123 | 49.7 | 0.3 | 50 | 331 | 332 | 4 | 50 |
| 124 | 10 | 40 | 50 | 334 | 332 | 4 | 50 |

EXAMPLES 125–129

Table 13 shows characteristics of sintered bodies made in accordance with Example 65 using 55 vol % of Si and 45 vol % of SiC and molding binder in the amounts changed within the range of 5–13 parts by weight whereby volumetric particle packing rate of molding products was changed. Relation between the volumetric particle packing rate of molded products and bending strength is shown in FIG. 12. From these results, it can be seen that it is preferred that the molded products have a volumetric particle packing rate of at least 70 vol %.

TABLE 13

| Examples | Volumetric packing of particles in molded product (%) | Bending strength (MN/m²) Room temp. | 1200° C. | Breaking toughness (MN/m^{3/2}) | Thermal shock resistance (times) |
|---|---|---|---|---|---|
| 125 | 65 | 154 | 154 | 3 | 42 |
| 126 | 69 | 257 | 254 | 3 | 48 |
| 127 | 70 | 310 | 310 | 5 | 48 |
| 128 | 73 | 359 | 358 | 6 | 50 |
| 129 | 75 | 390 | 390 | 7 | 50 |

EXAMPLES 130–144

Table 14 shows volumetric particle packing rate of molded bodies made in the same manner as in Example 65 with changing blending ratio of raw materials and amount of molding binder.

FIG. 13 shows relation between specific surface area of the raw materials and suitable amount of binder. When the relation is within the hatched area, volumetric particle packing rate of molded bodies can be at least 70 vol %.

TABLE 14

| Examples | Raw material (parts by weight) Si | SiC | Specific surface area of raw material (cm²/g) | Amount of molding binder (part by weight) | Volumetric packing of particles in molded product (vol %) |
|---|---|---|---|---|---|
| 130 | 60 | 40 | 17100 | 5.0 | 65 |
| 131 | 60 | 40 | 17100 | 6.5 | 70 |
| 132 | 60 | 40 | 17100 | 9.0 | 76 |
| 133 | 60 | 40 | 17100 | 11.5 | 70 |
| 134 | 60 | 40 | 17100 | 12.5 | 64 |
| 135 | 90 | 10 | 25100 | 6.5 | 64 |
| 136 | 90 | 10 | 25100 | 9.3 | 70 |
| 137 | 90 | 10 | 25100 | 11.8 | 75 |
| 138 | 90 | 10 | 25100 | 14.3 | 70 |
| 139 | 90 | 10 | 25100 | 16.3 | 63 |
| 140 | 50 | 50 | 14500 | 4.1 | 63 |
| 141 | 50 | 50 | 14500 | 5.6 | 70 |
| 142 | 50 | 50 | 14500 | 8.1 | 76 |
| 143 | 50 | 50 | 14500 | 10.5 | 70 |
| 144 | 50 | 50 | 14500 | 12.4 | 62 |

EXAMPLE 145

Apparent viscosity of the kneaded products of the raw materials and the molding binder in Examples 130-144 was measured by flow tester.

Relation between the apparent viscosity and volumetric particle packing rate of the molded bodies is shown in FIG. 14. The smaller value of the apparent viscosity indicates better flowability, namely, superior moldability.

The apparent viscosity was measured by a flow tester having a nozzle of 6 mm diameter and 6.8 mm length at 150° C. and under a pressure of 39 MN/m$^2$.

FIG. 14 shows that the molded products can have a volumetric particle packing rate of at least 70 vol % by using a composition having an apparent viscosity within the range of $(3-90) \times 10^4$ N·s/m$^2$. The apparent viscosity of this range is relatively low and thus molded products of complicated shape can be easily produced.

EXAMPLE 146

60 Parts by weight of metallic Si powder of 0.9 μm in average particle size and 40 parts by weight of α-SiC powder of 16 μm in average particle size were mixed together with methanol in a pot mill and dried. Then, thereto was added 9 parts by weight of a polyethylene wax and the mixture was kneaded by a pressure kneader at 150° C. for 5 hours. Then, the mixture was pulverized and molded at 150° C. and under 1000 kg/cm$^2$ to a ring of 60 mm in outer diameter and 40 mm in inner diameter. After removal of the wax, the molded body was subjected to stepwise heat treatment to 1380° C. over a long period of time in nitrogen atmosphere to obtain a sintered body. Dimensional change between the molded body and the sintered body was small, namely, 0.15% and the sintered body was superior in dimensional accuracy. Void content of the sintered body was 15% and diameter of void was 20 μm or less.

Sliding surface was produced by polishing and subjected to sliding test using Al$_2$O$_3$ (relative density: 98%) as a partner material. The results are shown in Table 15. As a comparative example, results of test between FC-20 cast-iron products are also shown in Table 15.

Figure 15:
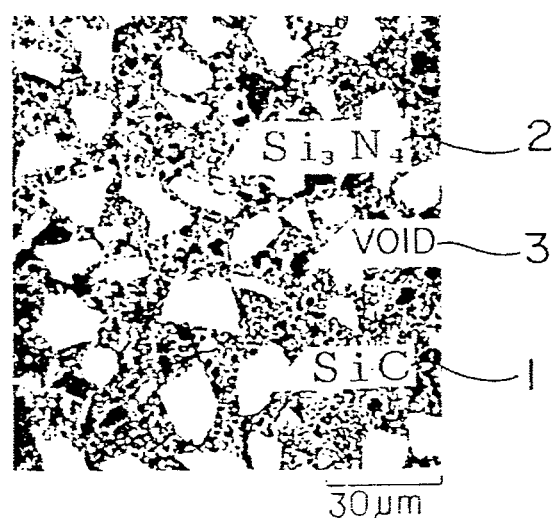
FIG. 15 is a micrograph of ceramic composition of a sliding surface in an example of the THIRD ASPECT of the present invention.

FIG. 15 shows a micrograph of the sliding surface of the sintered body obtained in this Example. In FIG. 15, 1 indicates a matrix phase, 2 indicates Si$_3$N$_4$ particles and 3 indicates voids.

From Table 1, it can be seen that the product of the present invention is small in friction coefficient and superior in wear resistance.

Figure 16:
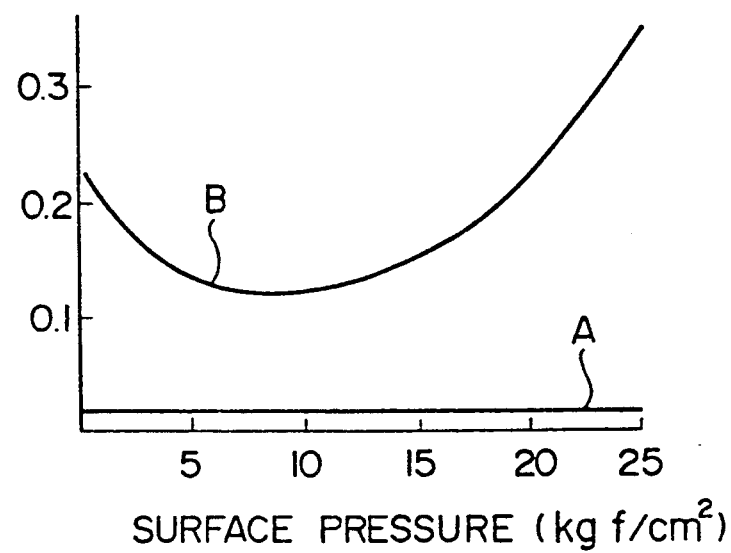
FIG. 16 is a graph which shows the relation between surface pressure and coefficient of friction in the THIRD ASPECT of the present invention.

Relation between surface pressure and friction coefficient when surface pressure was changed with keeping sliding speed at constant 3 m/sec is shown by curve A in FIG. 16. The result on Comparative Example 11 is also shown by curve B in FIG. 16. It can be recognized that the product of the present invention is superior in sliding characteristics.

TABLE 15

| | | Sliding material | | Friction coeffi- cient | Total abrasion wear (mg/cm/ 100 h) | State of sliding |
|---|---|---|---|---|---|---|
| | | (I) | (II) | | | |
| Example | 146 | SiC/ Si$_3$N$_4$ | Al$_2$O$_3$ | 0.008 | 0.06 | Good |
| Comparative Example | 11 | FC-20 | FC-20 | 0.12 | 72 | Bragging |

Sliding conditions: In machine oil at surface pressure of 10 kgf/cm$^2$ and sliding speed of 3 m/sec.

EXAMPLES 147-204

The sliding test was conducted in the same manner as in Example 146 except that Al$_2$O$_3$ as the partner material was replaced by other materials. The results are shown in Table 16. Results of comparative examples are shown in Table 17. Sliding conditions were surface pressure: 2 kgf/cm$^2$ and sliding speed: 2 m/sec.

From the results, it can be seen that the products of the present invention are small in friction coefficient and superior in thermal shock resistance. This is because the products of the present invention have open voids and comprise composite material. When test was conducted using SiC, Si$_3$N$_4$ having the same particle hardness as the partner material, particles of the products of the present invention were fallen off, leaving great sliding marks. The thermal shock resistance was evaluated as follows: A sintered body was kept at 1200° C. for 30 minutes and then quenched in water. This was repeated until cracks occurred and the number of the repetition was taken for evaluation.

TABLE 16

| No. | | Partner material for sliding test | Friction coeffi- cient | SiC/Si$_3$N$_4$ Abrasion wear (mg/cm$^2$/ 100 h) | Abrasion wear of partner material (mg/cm$^2$/ 100 h) | Thermal shock resistance of SiC/Si$_3$N$_4$ (times) |
|---|---|---|---|---|---|---|
| Examples | 147 | AlN | 0.014 | 0.03 | 0.08 | 51 |
| | 148 | SiO$_2$ glass | 0.008 | 0.02 | 0.04 | 51 |
| | 149 | SiO$_2$ | 0.007 | 0.03 | 0.03 | 51 |
| | 150 | TiN | 0.013 | 0.04 | 0.08 | 51 |
| | 151 | TiO$_2$ | 0.008 | 0.03 | 0.04 | 51 |
| | 152 | ZrN | 0.012 | 0.03 | 0.09 | 51 |
| | 153 | ZrO$_2$ | 0.007 | 0.03 | 0.04 | 51 |
| | 154 | carbon | 0.010 | 0.01 | 0.20 | 51 |
| | 155 | MgO | 0.010 | 0.02 | 0.03 | 51 |
| | 156 | apatite | 0.012 | 0.02 | 0.04 | 51 |
| | 157 | ZnO | 0.009 | 0.01 | 0.04 | 51 |
| Examples | 158 | ferite | 0.008 | 0.03 | 0.05 | 51 |
| | 159 | UO$_2$ | 0.010 | 0.03 | 0.05 | 51 |
| | 160 | BaTiO$_2$ | 0.009 | 0.02 | 0.07 | 51 |
| | 161 | PZT | 0.009 | 0.01 | 0.04 | 51 |
| | 162 | B$_4$C | 0.007 | 0.03 | 0.08 | 51 |
| | 163 | ZrB$_2$ | 0.012 | 0.03 | 0.12 | 51 |
| | 164 | TiB$_2$ | 0.012 | 0.03 | 0.11 | 51 |

TABLE 16-continued

| No. | | Partner material for sliding test | Friction coefficient | SiC/Si$_3$N$_4$ Abrasion wear (mg/cm$^2$/ 100 h) | Abrasion wear of partner material (mg/cm$^2$/ 100 h) | Thermal shock resistance of SiC/Si$_3$N$_4$ (times) |
|---|---|---|---|---|---|---|
| | 165 | TiO | 0.009 | 0.03 | 0.04 | 51 |
| | 166 | BeO | 0.009 | 0.03 | 0.05 | 51 |
| | 167 | (ZrO)P$_2$O$_7$ | 0.010 | 0.04 | 0.06 | 51 |
| | 168 | beryl | 0.010 | 0.03 | 0.05 | 51 |
| Examples | 169 | TiO$_2$—Al$_2$O$_3$ | 0.008 | 0.04 | 0.03 | 51 |
| ples | 170 | cordierite | 0.009 | 0.03 | 0.02 | 51 |
| | 171 | β-spodumene | 0.011 | 0.03 | 0.04 | 51 |
| | 172 | ZrC | 0.010 | 0.03 | 0.11 | 51 |
| | 173 | NgAl$_2$O$_4$ | 0.012 | 0.02 | 0.04 | 51 |
| | 174 | BeAl$_2$O$_4$ | 0.010 | 0.04 | 0.06 | 51 |
| | 175 | Be$_2$SiO$_4$ | 0.011 | 0.03 | 0.05 | 51 |
| | 176 | ZrSiO$_4$ | 0.011 | 0.04 | 0.05 | 51 |
| | 177 | celsian | 0.012 | 0.04 | 0.04 | 51 |
| | 178 | willemite | 0.012 | 0.04 | 0.05 | 51 |
| | 179 | 3Al$_2$O$_3$.2SiO$_2$ | 0.009 | 0.04 | 0.04 | 51 |
| Examples | 180 | 2BaO.3SiO$_2$ | 0.009 | 0.02 | 0.04 | 51 |
| ples | 181 | MgO—SiO$_2$ | 0.009 | 0.03 | 0.04 | 51 |
| | 182 | MgO | 0.009 | 0.04 | 0.03 | 51 |
| | 183 | B$_2$O$_3$ | 0.009 | 0.03 | 0.04 | 51 |
| | 184 | MoC | 0.010 | 0.05 | 0.11 | 51 |
| | 185 | Al$_2$O$_3$—ZrO$_2$ | 0.008 | 0.03 | 0.04 | 51 |
| | 186 | Al$_2$O$_3$—TiN | 0.008 | 0.04 | 0.08 | 51 |
| | 187 | SiO$_2$—Al$_2$O$_3$ | 0.008 | 0.03 | 0.07 | 51 |
| | 188 | TiC | 0.009 | 0.07 | 0.15 | 51 |
| | 189 | Al$_2$O$_3$—TiC | 0.008 | 0.05 | 0.09 | 51 |
| Examples | 190 | CaO | 0.010 | 0.02 | 0.05 | 51 |
| ples | 191 | TaC | 0.011 | 0.04 | 0.13 | 51 |
| | 192 | SUS304 | 0.009 | 0.01 | 0.03 | 51 |
| | 193 | Cr cast iron | 0.009 | 0.01 | 0.02 | 51 |
| | 194 | Super hard alloy | 0.009 | 0.01 | 0.02 | 51 |
| | 195 | FC20 | 0.009 | 0.01 | 0.03 | 51 |
| | 196 | Ni-Resist | 0.009 | 0.01 | 0.02 | 51 |
| | 197 | Steatite | 0.009 | 0.01 | 0.02 | 51 |
| | 198 | Ni-cast iron | 0.009 | 0.01 | 0.02 | 51 |
| | 199 | Al bronze | 0.010 | 0.01 | 0.04 | 51 |
| | 200 | P bronze | 0.010 | 0.01 | 0.04 | 51 |
| | 201 | MoS$_2$—C | 0.007 | 0.01 | 0.02 | 51 |
| Examples | 202 | Teflon | 0.007 | 0.01 | 0.02 | 51 |
| ples | 203 | Fluorine containing resin | 0.007 | 0.01 | 0.02 | 51 |
| | 204 | Glass-nylon | 0.008 | 0.01 | 0.02 | 51 |

Sliding conditions: In machine oil at surface pressure of 2 kg/cm$^2$ and sliding speed of 2 m/sec.

TABLE 17

| No. | | Condition of sliding materials | | Friction coefficient | (I) Abrasion wear (mg/cm$^2$/ 100 h) | (II) Abrasion wear (mg/cm$^2$/ 100 h) | Thermal shock resistance (times) | |
|---|---|---|---|---|---|---|---|---|
| | | (I) | (II) | | | | (I) | (II) |
| Comparative Examples | 12 | SiC | SiC | 0.12 | 0.24 | 0.24 | 31 | 31 |
| | 13 | SiC | Si$_3$N$_4$ | 0.15 | 0.22 | 0.31 | 31 | 37 |
| | 14 | SiC | Al$_2$O$_3$ | 0.18 | 0.18 | 0.41 | 31 | 12 |
| | 15 | SiC | TiC | 0.12 | 0.19 | 0.22 | 31 | 30 |
| | 16 | SiC | SiO$_2$ | 0.17 | 0.12 | 0.75 | 31 | 19 |
| | 17 | SiC | TiO$_2$ | 0.15 | 0.19 | 0.42 | 31 | 24 |
| | 18 | SiC | Carbon | 0.12 | 0.09 | 0.96 | 31 | — |
| | 19 | SiC | ZrO$_2$ | 0.14 | 0.18 | 0.22 | 31 | 16 |
| | 20 | SiC | ZrN | 0.16 | 0.17 | 0.23 | 31 | 30 |
| | 21 | SiC | AlN | 0.11 | 0.14 | 0.31 | 31 | 28 |
| | 22 | SiC | MgO | 0.22 | 0.16 | 0.56 | 31 | 10 |
| Comparative Examples | 23 | SiC | B$_4$C | 0.14 | 0.21 | 0.26 | 31 | 20 |
| | 24 | SiC | UO$_2$ | 0.15 | 0.19 | 0.18 | 31 | 19 |
| | 25 | Si$_3$N$_4$ | Si$_3$N$_4$ | 0.14 | 0.24 | 0.24 | 37 | 37 |
| | 26 | Si$_3$N$_4$ | Al$_2$O$_3$ | 0.23 | 0.18 | 0.42 | 37 | 12 |
| | 27 | Si$_3$N$_4$ | TiC | 0.18 | 0.34 | 0.22 | 37 | 30 |
| | 28 | Si$_3$N$_4$ | SiO$_2$ | 0.19 | 0.19 | 0.56 | 37 | 19 |
| | 29 | Si$_3$N$_4$ | TiO$_2$ | 0.18 | 0.20 | 0.22 | 37 | 24 |
| | 30 | Si$_3$N$_4$ | Carbon | 0.12 | 0.09 | 0.89 | 37 | — |
| | 31 | Si$_3$N$_4$ | ZrO$_2$ | 0.17 | 0.18 | 0.23 | 37 | 16 |
| Comparative Examples | 32 | Si$_3$N$_4$ | ZrN | 0.20 | 0.22 | 0.23 | 37 | 30 |
| | 33 | Si$_3$N$_4$ | AlN | 0.24 | 0.21 | 0.31 | 37 | 28 |
| | 34 | Si$_3$N$_4$ | MgO | 0.22 | 0.16 | 0.48 | 37 | 10 |
| | 35 | Si$_3$N$_4$ | B$_4$C | 0.18 | 0.31 | 0.28 | 37 | 20 |

TABLE 17-continued

|  | No. | Condition of sliding materials (I) | (II) | Friction coefficient | (I) Abrasion wear (mg/cm²/ 100 h) | (II) Abrasion wear (mg/cm²/ 100 h) | Thermal shock resistance (times) (I) | (II) |
|---|---|---|---|---|---|---|---|---|
|  | 36 | $Si_3N_4$ | $UO_2$ | 0.17 | 0.21 | 0.18 | 37 | 19 |
|  | 37 | $Al_2O_3$ | $Al_2O_3$ | 0.38 | 0.24 | 0.24 | 12 | 12 |
|  | 38 | $Al_2O_3$ | TiC | 0.24 | 0.24 | 0.25 | 12 | 30 |
|  | 39 | $Al_2O_3$ | $SiO_2$ | 0.23 | 0.19 | 0.48 | 12 | 19 |
|  | 40 | $Al_2O_3$ | $TiO_2$ | 0.24 | 0.21 | 0.21 | 12 | 24 |
| Comparative Examples | 41 | $Al_2O_3$ | Carbon | 0.10 | 0.09 | 1.17 | 12 | — |
|  | 42 | $Al_2O_3$ | $ZrO_2$ | 0.28 | 0.17 | 0.18 | 12 | 16 |
|  | 43 | $Al_2O_3$ | ZrN | 0.26 | 0.21 | 0.16 | 12 | 30 |
|  | 44 | $Al_2O_3$ | AlN | 0.21 | 0.31 | 0.34 | 12 | 28 |
|  | 45 | $Al_2O_3$ | FC-20 | 0.28 | 0.24 | 1.21 | 12 | — |
|  | 46 | $Al_2O_3$ | Carbon iron | 0.28 | 0.23 | 1.02 | 12 | — |
|  | 47 | $Al_2O_3$ | PTFE | 0.17 | 0.14 | 0.56 | 12 | — |
|  | 48 | $ZrO_3$ | Carbon iron | 0.27 | 0.21 | 0.98 | 16 | — |
|  | 49 | Product of the present invention | Product of the present invention | 0.27 | 1.71 | 1.71 | 51 | 51 |
| Comparative Examples | 50 | Product of the present invention | SiC | 0.24 | 2.95 | 0.45 | 51 | 31 |
|  | 51 | Product of the present invention | $Si_3N_4$ | 0.28 | 2.24 | 0.53 | 51 | 37 |

Sliding conditions: In machine oil at surface pressure of 2 kg/cm² and sliding speed of 2 m/sec.

EXAMPLES 205-210

The same test as in Example 146 was conducted on sintered bodies different in void content and diameter obtained in the same manner as in Example 146 with changing amount of binder. The results are shown in Table 18.

Sliding conditions were surface pressure: 10 kgf/cm² and sliding speed: 1 m/sec.

From the results, it can be seen that when void content exceeds 30%, abrasion were abruptly increases and when diameter of void is more than 100 μm, abrasion wear also increases and the products of the present invention are superior in sliding properties.

TABLE 18

| No. |  | Sliding materials (I) | (II) | $SiC/Si_3N_4$ Void content (%) | $SiC/Si_3N_4$ Maximum void diameter (μm) | Friction coefficient | Total abrasion wear (mg/cm²/ 100 h) |
|---|---|---|---|---|---|---|---|
| Examples | 205 | $SiC/Si_3N_4$ | $Al_2O_3$ | 5 | 5 | 0.007 | 0.07 |
|  | 206 | $SiC/Si_3N_4$ | $Al_2O_3$ | 10 | 8 | 0.007 | 0.08 |
|  | 207 | $SiC/Si_3N_4$ | $Al_2O_3$ | 15 | 15 | 0.007 | 0.08 |
|  | 208 | $SiC/Si_3N_4$ | $Al_2O_3$ | 20 | 15 | 0.007 | 0.08 |
|  | 209 | $SiC/Si_3N_4$ | $Al_2O_3$ | 25 | 30 | 0.007 | 0.11 |
|  | 210 | $SiC/Si_3N_4$ | $Al_2O_3$ | 30 | 100 | 0.007 | 0.89 |
| Examples (Comparative) | 52 | $SiC/Si_3N_4$ | $Al_2O_3$ | 35 | 40 | 0.007 | 1.57 |
|  | 53 | $SiC/Si_3N_4$ | $Al_2O_3$ | 40 | 50 | 0.007 | 2.96 |
|  | 54 | $SiC/Si_3N_4$ | $Al_2O_3$ | 50 | 80 | 0.007 | 3.24 |
|  | 55 | $SiC/Si_3N_4$ | $Al_2O_3$ | 30 | 110 | 0.007 | 1.54 |
| Examples | 56 | $SiC/Si_3N_4$ | $Al_2O_3$ | 30 | 150 | 0.007 | 3.21 |
| (Comparative) | 57 | $SiC/Si_3N_4$ | $Al_2O_3$ | 30 | 210 | 0.007 | Dragging for 70 h |

Sliding conditions: In machine oil at surface pressure of 10 kgf/cm² and sliding speed of 2 m/sec.

EXAMPLES 211-217

Sintered bodies were prepared in the same manner as in Example 146 with changing average particle size of SiC powder and the sliding test was conducted using $Al_2O_3$ as the partner material. The results are shown in Table 19. When SiC particle is great, dragging occurs due to the SiC particles fallen off. The products of the present invention are superior in wear resistance. Excellent sliding properties were exhibited also when two or more SiC particles different in average particle size were mixed.

TABLE 19

| No. |  | Average particle size of SiC in $SiC/Si_3N_4$ (μm) | Friction coefficient | $SiC/Si_3N_4$ Abrasion wear (mg/cm²/ 100 h) | $Al_2O_3$ Abrasion wear (mg/cm²/ 100 h) | $SiC/Si_3N_4$ Thermal shock resistance (times) |
|---|---|---|---|---|---|---|
| Examples | 211 | 0.5 | 0.08 | 0.02 | 0.03 | 50 |
|  | 212 | 2 | 0.08 | 0.03 | 0.03 | 51 |
|  | 213 | 10 | 0.07 | 0.03 | 0.04 | 51 |

TABLE 19-continued

| No. | | Average particle size of SiC in SiC/Si$_3$N$_4$ (μm) | Friction coefficient | SiC/Si$_3$N$_4$ Abrasion wear (mg/cm$^2$/ 100 h) | Al$_2$O$_3$ Abrasion wear (mg/cm$^2$/ 100 h) | SiC/Si$_3$N$_4$ Thermal shock resistance (times) |
|---|---|---|---|---|---|---|
| | 214 | 50 | 0.07 | 0.04 | 0.07 | 51 |
| | 215 | 72 | 0.07 | 0.07 | 0.12 | 52 |
| | 216 | 85 | 0.07 | 0.09 | 0.17 | 52 |
| | 217 | 100 | 0.07 | 0.10 | 0.22 | 51 |
| Examples | 58 | 120 | 0.07 | 0.22 | 1.08 | 51 |
| (Comparative) | 59 | 240 | 0.07 | 0.44 | 1.54 | 51 |
| | 60 | 400 | 0.07 | 0.81 | 2.12 | 51 |
| | 61 | 800 | 0.07 | 1.23 | 5.23 | 51 |

Sliding conditions: Surface pressure 10 kgf/cm$^2$ and sliding speed 5 m/sec. in SUNISO 4GS oil (made by Nippon Sun Sekyu K.K.)

EXAMPLES 218-220

60 parts by weight of metallic Si powder of 1 μm in average particle size and 40 parts by weight of β-SiC powder of 8 μm in average particle size were mixed together with an organosilicone high polymer and xylene as a binder in a pot mill and dried. The mixture was solded to a ring of 150 mm outer diameter, 100 mm inner diameter and 20 mm thick at 100° C. and under 2000 kgf/cm$^2$. The molded body was heated stepwise to 1400° C. over a long period of time in nitrogen and ammonia mixed atmosphere. Void content of the sintered bodies was 10% and void diameter was 10 μm or less. Sliding test was conducted in the same manner as in Example 146 and the results are shown in Table 20. From the results, it can be seen that the products of the present invention are superior in sliding properties.

metallic Si and SiC to change the ratio of Si$_3$N$_4$ phase and SiC phase in the sintered bodies. Results of sliding test on these sintered bodies are shown in Table 21. The sliding conditions were same as in Example 210.

From the results, it can be seen that with increase in the amount of SiC particle the mechanical strength decreases, resulting in increase in abrasion wear. Therefore, it is preferred that amount of SiC particle is 70 vol % or less. Considering thermal shock resistance, SiC particle is preferably contained in an amount of at least 20 vol %.

Therefore, it is seen that reaction-bonded material of the present invention where SiC particles are bonded with Si$_3$N$_4$ is superior to the material comprising only Si$_3$N$_4$ or SiC in thermal shock resistance.

As comparative examples, the same tests were conducted on porous reaction-sintered Si$_3$N$_4$ body and SiC body and the results are also shown in Table 21.

TABLE 20

| No. | | Organo Si high polymer compound (part by weight) | Partner material | Friction coefficient | SiC/Si$_3$N$_4$ Abrasion wear (mg/cm$^2$/ 100 h) | Abrasion wear of partner material (mg/cm$^2$/ 100 h) |
|---|---|---|---|---|---|---|
| Examples | 218 | Siliconimide MW: 1500 (15) | Al$_2$O$_3$ | 0.007 | 0.02 | 0.03 |
| | 219 | Polysilane MW: 500 (10) | Al$_2$O$_3$ | 0.007 | .0.02 | 0.03 |
| | 220 | Polysil MW: 800 (12) | Al$_2$O$_3$ | 0.007 | 0.02 | 0.03 |

Sliding conditions: Surface pressure 10 kgf/cm$^2$ and sliding speed 5 m/sec. in SUNISO 4GS oil.

EXAMPLES 221-229

Sintered bodies were prepared in the same manner as in Example 146 with changing the raw material ratio of

TABLE 21

| No. | | Composition of sintered body | | Partner material | Friction coefficient | Si$_3$N$_4$/SiC Abrasion wear (mg/cm$^2$/ 100 h) | Abrasion wear of partner material (mg/cm$^2$/ 100 h) | Si$_3$N$_4$/SiC Thermal shock resistance (times) |
|---|---|---|---|---|---|---|---|---|
| | | Si$_3$N$_4$ | SiC | | | | | |
| Examples | 221 | 95 | 5 | Al$_2$O$_3$ | 0.022 | 0.38 | 0.24 | 37 |
| | 222 | 90 | 10 | Al$_2$O$_3$ | 0.019 | 0.18 | 0.09 | 42 |
| | 223 | 80 | 20 | Al$_2$O$_3$ | 0.008 | 0.04 | 0.04 | 50 |
| | 224 | 70 | 30 | Al$_2$O$_3$ | 0.007 | 0.04 | 0.03 | 51 |
| | 225 | 50 | 50 | Al$_2$O$_3$ | 0.007 | 0.04 | 0.03 | 52 |
| | 226 | 40 | 60 | Al$_2$O$_3$ | 0.008 | 0.05 | 0.05 | 52 |
| | 227 | 30 | 70 | Al$_2$O$_3$ | 0.009 | 0.09 | 0.15 | 51 |
| | 228 | 20 | 80 | Al$_2$O$_3$ | 0.012 | 0.15 | 0.48 | 43 |
| | 229 | 10 | 90 | Al$_2$O$_3$ | 0.057 | 0.34 | 0.89 | 40 |
| Compara- | 62 | 100 | — | Al$_2$O$_3$ | 0.101 | Reaction | 1.24 | 20 |

TABLE 21-continued

| No. | Composition of sintered body Si$_3$N$_4$ | SiC | Partner material | Friction coefficient | Si$_3$N$_4$/SiC Abrasion wear (mg/cm$^2$/ 100 h) | Abrasion wear of partner material (mg/cm$^2$/ 100 h) | Si$_3$N$_4$/SiC Thermal shock resistance (times) |
|---|---|---|---|---|---|---|---|
| tive Examples 63 | — | 100 | Al$_2$O$_3$ | 0.120 | sintering 2.10 Reaction sintering 1.54 | 3.24 | 34 |

Sliding conditions: Surface pressure of 12 kgf/cm$^2$ and sliding speed of 5 m/sec. in SUNISO 4GS oil.

EXAMPLE 230

13 Parts by weight of a mixture of polyethylene, stearic acid and a synthetic wax was added to 60 parts by weight of metallic Si powder of 0.5 μm in average particle size and 40 parts by weight of SiC powder of 10 μm in average particle size and the mixture was kneaded. This raw material was injection molded into a floating seal as shown by reference number 7 in FIG. 18. After removal of the wax in the molded body, this was heated from 1100° C.-1400° C. at 6° C./h in nitrogen atmosphere. The dimensional change of the floating seal on sintering was small, namely, 0.13% and this was able to be used only by finishing a sliding surface. Therefore, it is considered that variability in dimension of bodies can be inhibited and working cost can be reduced to half. Thus, the bodies are suitable for mass production. Results of sliding tests are shown in Table 22.

TABLE 22

| No. | Combination of sliding material (I) | (II) | Friction coefficient | Total abrasion wear (mg/cm$^2$/ 100 h) | Abrasion wear (mg/cm$^2$/ 100 h) |
|---|---|---|---|---|---|
| Example 230 | Si$_3$N$_4$/ SiC | Cr cast iron | 0.007 | 0.02 | 0.22 |

Sliding conditions: Surface pressure of 8 kgf/cm$^2$ and sliding speed 3 m/sec. in SUNISO 4GS oil.

EXAMPLE 231

The sintered body obtained in Example 146 was subjected to HIP treatment at 2000° C. for 4 hours under 80 atm in nitrogen atmosphere. Test results on the resulting sintered body are shown in Table 23.

TABLE 23

| No. | Sintered body after HIP treatment (I) Void content (%) | Thermal shock resistance (times) | Partner material (II) | Friction coefficient | (I) Abrasion wear (mg/cm$^2$/ 100 h) | (II) Abrasion wear (mg/cm$^2$/ 100 h) |
|---|---|---|---|---|---|---|
| Example 231 | 2 | 53 | Al$_2$O$_3$ | 0.007 | 0.01 | 0.02 |

Sliding conditions: Surface pressure of 10 kgf/cm$^2$ and sliding speed 7 m/sec. in SUNISO 4GS oil.

EXAMPLE 232

A furan resin was impregnated into the voids of the sintered body obtained in Example 146 by autoclave to reduce open void content. Test results on the resulting sintered body are shown in Table 24.

TABLE 24

| No. | Furan resin impregnated product (I) Void content | Partner material (II) | Friction coefficient | (I) Abrasion wear (mg/cm$^2$/ 100 h) | (II) Abrasion wear (mg/cm$^2$/ 100 h) |
|---|---|---|---|---|---|
| Example 232 | 7 | Al$_2$O$_3$ | 0.005 | 0.001 | 0.002 |

Sliding conditions: Surface pressure of 10 kgf/cm$^2$ and sliding speed 7 m/sec. in SUNISO 4GS oil.

EXAMPLES 233-240

Sintered bodies were made in the same manner as in Example 146 except that SiC whisker as shown in Table 25 was used in place of α-SiC particle. Sliding test results on the resulting sintered bodies are shown in Table 25, wherein average aspect ratio of whisker is indicated by A and average length by L.

TABLE 25

| No. | SiC Whisker (I) | Partner material (II) | Friction coefficient | (I) Abrasion wear (mg/cm$^2$/ 100 h) | (II) Abrasion wear (mg/cm$^2$/ 100 h) |
|---|---|---|---|---|---|
| Examples 233 | A = 50 L = 10 μm | Al$_2$O$_3$ | 0.007 | 0.01 | 0.02 |
| 234 | A = 100 L = 50 μm | Al$_2$O$_3$ | 0.007 | 0.01 | 0.02 |
| 235 | A = 200 L = 35 μm | Al$_2$O$_3$ | 0.007 | 0.03 | 0.05 |
| 236 | A = 100 L = 100 μm | Al$_2$O$_3$ | 0.007 | 0.03 | 0.04 |
| 237 | A = 60 L = 200 μm | Al$_2$O$_3$ | 0.007 | 0.09 | 0.11 |
| 238 | A = 50 L = 250 μm | Al$_2$O$_3$ | 0.007 | 0.10 | 0.23 |
| 239 | A = 210 L = 100 μm | Al$_2$O$_3$ | 0.007 | 0.15 | 0.26 |

TABLE 25-continued

| No. | SiC Whisker (I) | Partner material (II) | Friction coefficient | (I) Abrasion wear (mg/cm²/100 h) | (II) Abrasion wear (mg/cm²/100 h) |
|---|---|---|---|---|---|
| 240 | A = 220 L = 350 μm | Al₂O₃ | 0.007 | 0.25 | 0.56 |

Sliding conditions: Surface pressure of 10 kgf/cm² and sliding speed 7 m/sec. in SUNISO 4GS oil.

EXAMPLE 241

The raw material obtained in Example 146 was injection molded into a floating seal as shown in FIG. 18 and this molded body was impregnated with a furan resin using an autoclave in the same manner as in Example 232. As a partner material, a floating seal as shown in FIG. 18 was made by injection molding of Al₂O₃ (relative density 98%). They were incorporated into rolling wheel of caterpiller rotating axis of a construction machine and actual working test was conducted. After 500 hours test, overhaul thereof was carried out to find no hydraulic leakage and sliding marks.

What is claimed is:

1. A ceramic composite, consisting essentially of:
   a first zone including electrically conductive ceramic grains, and particles and whiskers comprised of at least one material selected from the group consisting of Si₃N₄, Si₂N₂O and SiO₂;
   a second zone contiguous with said first zone and including electrically insulating ceramic grains, and particles and whiskers comprised of at least one material selected from the group consisting of Si₃N₄, Si₂N₂O and SiO₂, wherein said particles and whiskers are reaction products produced upon sintering metallic silicon in a nitrogen-containing atmosphere and said first and second zones are bonded together by said particles and whiskers.

2. A ceramic composite, according to claim 1, wherein the ratio of the whiskers to the particles and whiskers is in the range of 1/99 to 70/30.

3. A ceramic composite, according to claim 1, wherein the ratio of the whiskers to the particles and whiskers is in the range of 10/90 to 30/70.

4. A ceramic composite, as set forth in claim 1, wherein the ceramic composite defines a void content in the range of 5–40%.

5. A ceramic composite, consisting essentially of: a first zone including electrically conductive ceramic grains selected from the group consisting of TiN, TiC, TiB₂, TiSi₂, ZrN, ZrC, ZrB₂, ZrSi₂, HfN, HfC, TaN, TaC, TaB₂, TaSi₂, Mo₂N, Mo₂C, MoB, Cr₂N, Cr₃C₂, CrB, CrSi₂, NbN, NbC, NbSi₂, VN, VC, WC, and WSi₂, and particles and whiskers comprised of at least one silicon-containing compound;
   a second zone contiguous with said first zone and including electrically insulating ceramic grains, and particles and whiskers comprised of at least one silicon-containing compound, wherein said particles and whiskers are reaction products produced upon sintering metallic silicon in a nitrogen-containing atmosphere, and said first and second zones are bonded together by said particles and whiskers.

6. A ceramic composite, according to claim 5, wherein the ratio of the whiskers to the particles and whiskers is in the range of 1/99 to 70/30.

7. A ceramic composite, according to claim 6, wherein the ratio of the whiskers to be particles and whiskers is in the range of 10/90 to 30/70.

8. A ceramic composite, as set forth in claim 5, wherein the ceramic composite defines a void content in the range of 5–40%.

9. A ceramic composite, as set forth in claim 5, wherein said whiskers and particles are selected from the group consisting of Si₃N₄, Si₂N₂O and SiO₂.

10. A ceramic composite, consisting essentially of: a first zone comprised of a percentage of conductive ceramic grains;
    a second zone contiguous with said first zone and comprised of a percentage of insulating ceramic grains, said first and second zones defining a plurality of voids in which, upon inducement, silicon composition particles present therein form whiskers; and,
    whiskers defining a crystal structurally bonded with the conductive ceramic grains, insulating ceramic grains and the silicon composition particles, said whiskers providing a means for bonding said first and second zones.

11. A ceramic composite, as set forth in claim 10, wherein the ceramic composite defines a void content in the range of 5–40%.

12. A ceramic composite, according to claim 10, wherein said silicon composition is selected from the group consisting of Si₃N₄, Si₂N₂O and SiO₂.

* * * * *

UNITED STATES PATENT AND TRADEMARK OFFICE
CERTIFICATE OF CORRECTION

PATENT NO. : 5,130,055
DATED : July 14, 1992
INVENTOR(S) : Yasutomi et al

It is certified that error appears in the above-indentified patent and that said Letters Patent is hereby corrected as shown below:

On the title page, insert after item [76] Inventors: the following:

--[73] Assignee: Hatachi, Ltd. 6 Kanda Surugadai 4-chome Chiyoda-ku, Tokyo Japan--.

Signed and Sealed this

Thirtieth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,130,055
DATED : July 14, 1992
INVENTOR(S) : Yoshiyuki Yasutomi, et al.

It is certified that error appears in the above-indentified patent and that said Letters Patent is hereby corrected as shown below:

On the title page, after item (76) Inventors: Assignee, should read
--Hitachi, Ltd.--.

This certificate supersedes Certificate of Correction issued November 30, 1993.

Signed and Sealed this

First Day of February, 1994

Attest:

BRUCE LEHMAN

Attesting Officer            Commissioner of Patents and Trademarks